US012505995B2

(12) United States Patent
Mizutani

(10) Patent No.: US 12,505,995 B2
(45) Date of Patent: Dec. 23, 2025

(54) MASS SPECTROMETER AND POWER SUPPLY DEVICE

(71) Applicant: SHIMADZU CORPORATION, Kyoto (JP)

(72) Inventor: Shiro Mizutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 337 days.

(21) Appl. No.: 18/447,640

(22) Filed: Aug. 10, 2023

(65) Prior Publication Data

US 2024/0112899 A1 Apr. 4, 2024

(30) Foreign Application Priority Data

Sep. 30, 2022 (JP) ................................ 2022-158829

(51) Int. Cl.
*H01J 49/00* (2006.01)
*H01J 49/02* (2006.01)
*H01J 49/42* (2006.01)

(52) U.S. Cl.
CPC ........ *H01J 49/0009* (2013.01); *H01J 49/022* (2013.01); *H01J 49/4215* (2013.01)

(58) Field of Classification Search
CPC .... H01J 49/0009; H01J 49/022; H01J 49/025; H01J 49/02; H01J 49/4215
See application file for complete search history.

(56) References Cited

U.S. PATENT DOCUMENTS

2011/0084690 A1* 4/2011 Vandermey ........... H01J 49/022 324/119
2013/0200261 A1* 8/2013 Mizutani ................. H01J 49/02 250/290

FOREIGN PATENT DOCUMENTS

JP 2002-33075 A 1/2002
JP 5556890 B2 7/2014

* cited by examiner

*Primary Examiner* — David E Smith
(74) *Attorney, Agent, or Firm* — Sughrue Mion, PLLC

(57) ABSTRACT

A power supply device applies a voltage to a quadrupole mass filter. The power supply device has a main substrate and a wave-detection substrate. The main substrate includes a detector. The wave-detection substrate includes a wave detector and an identifier. The wave detector detects an AC component of a voltage to be applied to the quadrupole mass filter as a wave-detection voltage. The identifier outputs identification information of the wave detector defined in correspondence with the configuration of a rectifying device of the wave detector. The detector detects identification information output by the identifier, and supplies the detected identification information to a corrector that corrects a deviation of voltage caused by a leakage current of the rectifying device.

15 Claims, 17 Drawing Sheets

FIG. 11

| FIRST SWITCH | SECOND SWITCH | THIRD SWITCH | ... | IDENTIFICATION INFORMATION |
|---|---|---|---|---|
| 0 | 0 | 0 | 0 | 0 |
| 1 | 0 | 0 | 0 | 1 |
| 0 | 1 | 0 | 0 | 2 |
| 1 | 1 | 0 | 0 | 3 |
| 0 | 0 | 1 | 0 | 4 |
| ... | ... | ... | ... | ... |

FIG. 12

| IDENTIFICATION INFORMATION | CORRECTION VOLTAGE [V] |
|---|---|
| 0 | AA |
| 1 | BB |
| 2 | CC |
| 3 | DD |
| 4 | EE |
| ⋮ | ⋮ |

MASS SPECTROMETER AND POWER SUPPLY DEVICE

BACKGROUND

Technical Field

The present invention relates to a mass spectrometer and a power supply device.

Description of Related Art

A mass spectrometer is known as an analysis device that analyzes the mass of a component included in a sample. For example, in a quadrupole mass spectrometer described in JP 2002-033075 A, various ions generated from a sample by an ion source are introduced into a quadrupole filter. A high-frequency voltage and a DC voltage are applied to four rod electrodes of the quadrupole filter by a quadrupole power supply. Only ions having a particular mass-to-charge ratio selectively pass through the quadrupole filter and are detected by the detector. The mass-to-charge ratio of ions passing through the quadrupole filter depends on a high-frequency voltage and a DC voltage applied to each rod electrode.

In the quadrupole power supply, a high-frequency voltage applied to each rod electrode is converted into a wave-detection current through a capacitor, and the wave-detection current flows through a diode of the wave detector. The wave-detection current is converted into a DC voltage by flowing through a resistor, and the difference between the converted voltage and a target voltage is fed back. The target voltage is set in correspondence with any mass-to-charge ratio. Therefore, it is possible to sweep a high-frequency voltage applied to each rod electrode and scan the mass-to-charge ratio of ions passing through the quadrupole filter by sweeping a target voltage.

A DC voltage is controlled such that the ratio of the DC voltage to a high-frequency voltage is constant when the high-frequency voltage is swept. Here, a stable region in which ions can stably pass through a quadrupole filter (a stable region based on a stable condition of a solution of the Mathieu equation) is indicated by the substantially triangular frame of FIGS. 7(*a*) and 7(*b*) of JP 5556890 B2. As the mass-to-charge ratio increases, the area of the stable region increases while moving in the same direction as the direction in which the mass-to-charge ratio increases.

In JP 5556890 B2, the straight line representing a change in DC voltage with respect to a mass-to-charge ratio changes so as to cross the same portion of a stable region which similarly changes in correspondence with the mass-to-charge ratio. This maintains a uniform mass resolution of the quadrupole filter over the entire range of the mass-to-charge ratio.

SUMMARY

In a case in which a relatively large wave-detection current flows through a diode, a wave-detection voltage is converted into a voltage smaller than a voltage to be originally converted due to a leakage current in the diode, and an output voltage is larger than a target voltage in a feedback circuit. In this case, since the difference between the output voltage and the target voltage increases in a range in which a mass-to-charge ratio is large, a deviation of mass-to-charge ratio is generated. Further, even in a case in which the control described in JP 5556890 B2 is carried out, the straight line representing a change in DC voltage does not cross a desired portion of the stable region in the range in which the mass-to-charge ratio is large, and the uniformity of mass resolution is degraded.

In a case in which the characteristics of diodes are known, it is possible to implement a control circuit for correcting a deviation of mass-to-charge ratio caused by the above-mentioned non-linearity of diodes in the quadrupole power supply. However, in recent years, diodes available on the market changes in a short period of time. Therefore, in a case in which a diode needs to be replaced in maintenance of the quadrupole power supply, a substitute or a compatible product cannot be easily obtained. Further, since the quadrupole power supply is expensive, in a case in which an alternative or compatible product of a diode is not available, it is necessary to replace the entire quadrupole power supply including a control circuit. As a result, the maintenance cost increases.

An object of the present invention is to provide a mass spectrometer and a power supply device capable of reducing labor and cost for maintenance.

One aspect of the present invention relates to a mass spectrometer including a mass filter that selects ions having a mass-to-charge ratio corresponding to an applied voltage, a power supply device that has a first substrate and a second substrate and applies a voltage to the mass filter, and a corrector, wherein the first substrate includes a wave detector that detects an AC component of a voltage to be applied to the mass filter as a wave-detection voltage by using a rectifying device, and an identifier that outputs identification information of the wave detector defined in accordance with a configuration of the rectifying device of the wave detector, the second substrate includes a detector that detects the identification information output by the identifier, and the corrector corrects a deviation of voltage caused by a leakage current of the rectifying device based on the identification information detected by the detector.

Another aspect of the present invention relates to a power supply device that applies a voltage to a mass filter that selects ions having a mass-to-charge ratio corresponding to an applied voltage, and includes a first substrate, and a second substrate, wherein the first substrate includes a wave detector that detects an AC component of a voltage to be applied to the mass filter as a wave-detection voltage by using a rectifying device, and an identifier that outputs identification information of the wave detector defined in accordance with a configuration of the rectifying device of the wave detector, and the second substrate includes a detector that detects the identification information output by the identifier and supplies the detected identification information to a corrector for correcting a deviation of voltage caused by a leakage current of the rectifying device based on the identification information.

With the present invention, the labor and cost for maintenance of the power supply device can be reduced.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 11 is a diagram showing one example of identification information;

FIG. 12 is a diagram showing one example of correspondence information;

DETAILED DESCRIPTION

(1) Configuration of Mass Spectrometer

Figure 1:
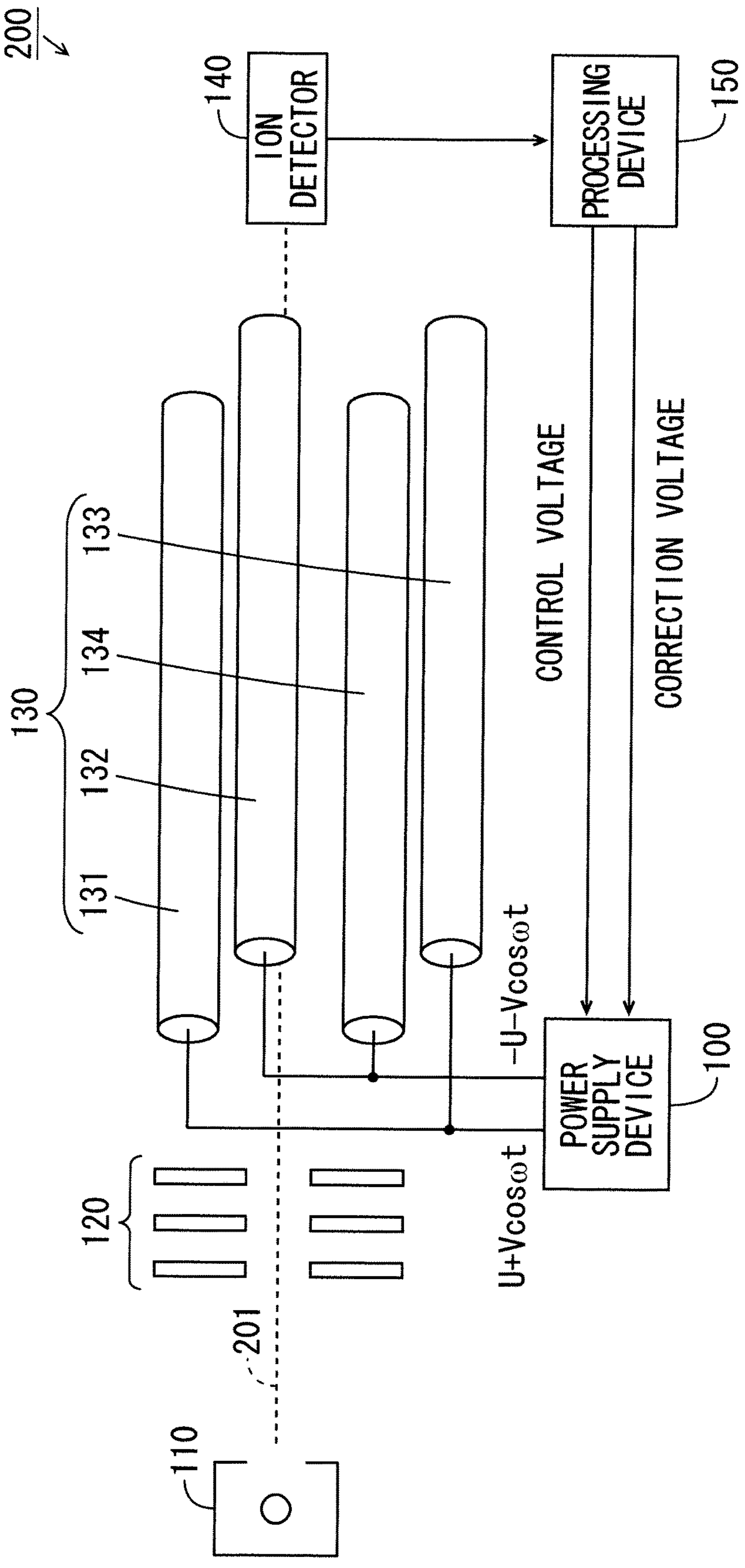
FIG. 1 is a diagram showing the configuration of a mass spectrometer according to one embodiment of the present invention.

A mass spectrometer and a power supply device according to embodiments of the present invention will be described below in detail with reference to the drawings. FIG. 1 is a diagram showing the configuration of a mass spectrometer according to one embodiment of the present invention. As shown in FIG. 1, the mass spectrometer 200 includes the power supply device 100, an ion source 110, an ion transporter 120, a quadrupole mass filter 130, an ion detector 140 and a processing device 150. The ion source 110, the ion transporter 120, the quadrupole mass filter 130 and the ion detector 140 are contained in a vacuum container (not shown).

The ion source 110 includes a light source in an ultraviolet region, for example, and generates ions of various types of components included in a sample by irradiating the sample to be analyzed with pulsed light. The ion transporter 120 includes an ion lens, for example, and introduces ions generated by the ion source 110 into the quadrupole mass filter 130 along an ion optical axis 201 indicated by the dotted line while converging the ions.

The quadrupole mass filter 130 includes four rod electrodes 131 to 134. The rod electrodes 131 to 134 are arranged in parallel to one another so as to be inscribed in a virtual cylinder centered at the ion optical axis 201. Therefore, the rod electrode 131 and the rod electrode 133 are opposite to each other with the ion optical axis 201 therebetween. The rod electrode 132 and the rod electrode 134 are opposite to each other with the ion optical axis 201 therebetween.

The power supply device 100 applies a summed voltage+U+Vcosωt which is obtained when a DC voltage+U is added to a high-frequency voltage+Vcosωt to the rod electrodes 131, 133. Further, the power supply device 100 applies the summed voltage−U−Vcosωt which is obtained when a DC voltage—U is added to a high-frequency voltage—Vcosωt to the rod electrodes 132, 134. Thus, among the ions introduced into the quadrupole mass filter 130, only the ions having a specific mass-to-charge ratio defined based on a DC voltage U and an amplitude V of the high-frequency voltage pass through the quadrupole mass filter 130. The configuration of the power supply device 100 will be described below.

The ion detector 140 includes a secondary electron multiplier, for example. The ion detector 140 detects the ions that have passed through the quadrupole mass filter 130 and outputs a detection signal indicating a detection amount to the processing device 150.

The processing device 150 is realized by an information processing device such as a personal computer including a CPU (Central Processing Unit) and a storage, for example. The processing device 150 controls the operations of the power supply device 100, the ion transporter 120, the quadrupole mass filter 130 and the ion detector 140. Further, the processing device 150 processes a detection signal output by the ion detector 140 to generate a mass spectrum representing the relationship between a mass-to-charge ratio of ions and a detection amount.

(2) Configuration of Power Supply Device

Figure 2:
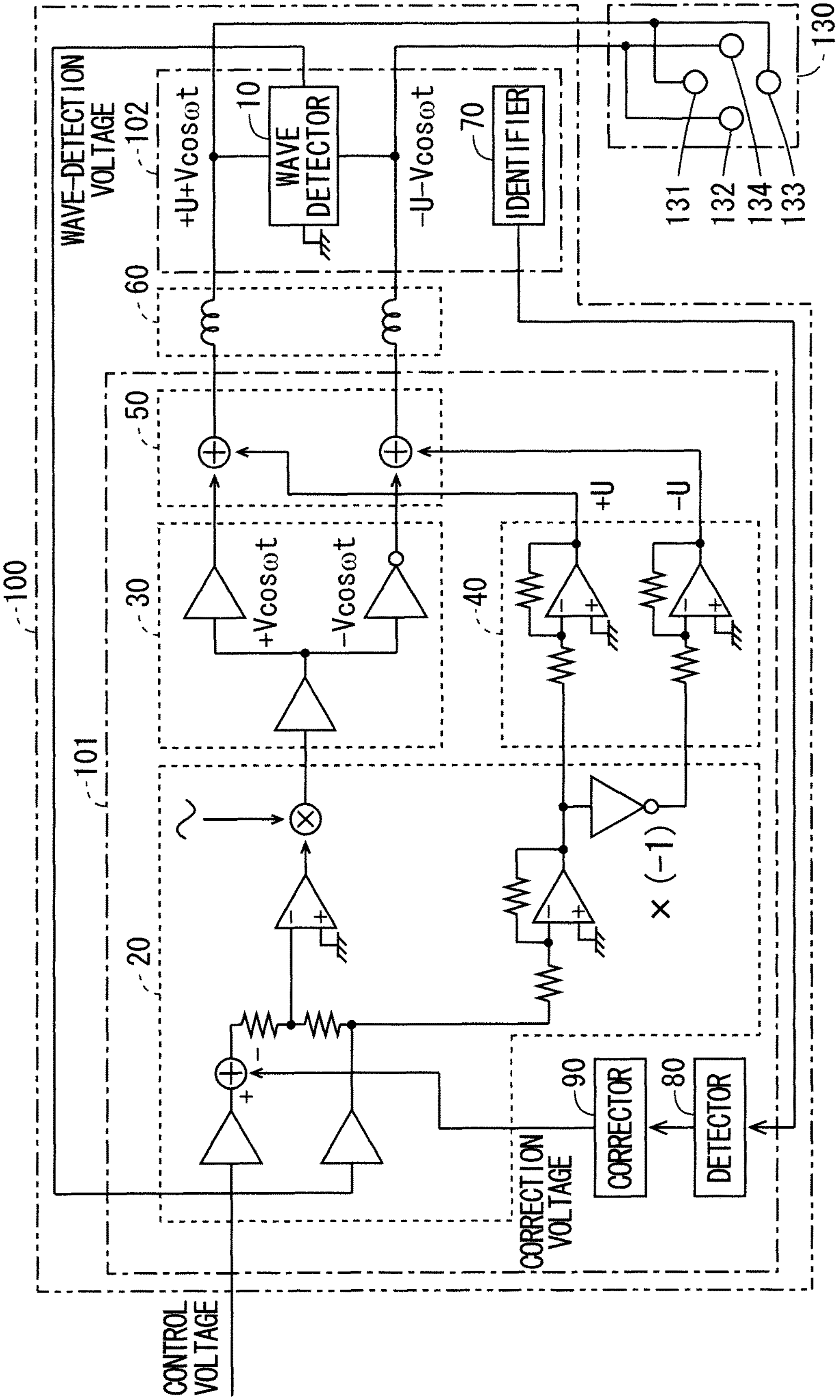
FIG. 2 is a diagram showing the configuration of a power supply device of FIG. 1.

FIG. 2 is a diagram showing the configuration of the power supply device 100 of FIG. 1. As shown in FIG. 2, the power supply device 100 includes a wave detector 10, a voltage controller 20, a high-frequency voltage generator 30, a DC voltage generator 40, an adder 50, a coil 60, an identifier 70, a detector 80 and a corrector 90. The wave detector 10 has a rectifier including a rectifying device. Details of the wave detector 10 will be described below.

The power supply device 100 includes a main substrate 101 and a wave-detection substrate 102. The wave-detection substrate 102 is an example of a first substrate, and the main substrate 101 is an example of a second substrate. The voltage controller 20, the high-frequency voltage generator 30, the DC voltage generator 40, the adder 50, the detector 80 and the corrector 90 are mounted on the main substrate 101. The wave detector 10 and the identifier 70 are mounted on the wave-detection substrate 102. The wave-detection substrate 102 may be arranged in the vicinity of a vacuum container (not shown) of the mass spectrometer 200.

The voltage controller 20, the high-frequency voltage generator 30, the DC voltage generator 40 and the adder 50 are each constituted by a circuit element such as an electrical resistor, an operational amplifier or a logic circuit. The coil 60 is constituted by a transformer, for example. While being is fixed to a casing (not shown) of the power supply device 100 in the present example, the coil 60 may be mounted on the main substrate 101 or the wave-detection substrate 102.

A control voltage is supplied to the voltage controller 20 by the processing device 150 of FIG. 1, and a wave-detection voltage is fed back to the voltage controller from the wave detector 10. A control voltage is a voltage for controlling a high-frequency voltage applied to the quadrupole mass filter 130 such that the high-frequency voltage coincides with any target voltage. A wave-detection voltage to be fed back by the wave detector 10 will be described below.

The voltage controller 20 suitably performs various processes such as comparison, modulation, amplification and addition on a control voltage and a wave-detection voltage to generate voltages of two systems, and supplies the voltages to the high-frequency voltage generator 30 and the DC voltage generator 40. The high-frequency voltage generator 30 generates high-frequency voltages±Vcosωt having phases different from each other by 180° based on a voltage supplied by the voltage controller 20. The DC voltage generator 40 generates DC voltages±U having different polarities based on a voltage supplied by the voltage controller 20.

The adder 50 adds the high-frequency voltages±Vcosωt generated by the high-frequency voltage generator 30 to the DC voltages±U generated by the DC voltage generator 40, thereby generating a voltage+U+Vcosωt and a voltage−U−Vcosωt. The coil 60 amplifies the voltage±U±Vcosωt generated by the adder 50. Further, the coil 60 applies the amplified voltage+U+Vcosωt to the rod electrodes 131, 133 from one output terminal, and applies the amplified voltage−U−Vcosωt to the rod electrodes 132, 134 from the other output terminal.

The identifier 70 outputs identification information of the wave detector 10 defined in correspondence with the configuration of the rectifying device of the wave detector 10. Here, the configuration of a rectifying device means the number of rectifiers (the number of parallel connections) of the wave detector 10 or the characteristics of the rectifying device. In the present embodiment, in a case in which the product names (manufacturer and model numbers) of rectifying devices are the same, it is assumed that the characteristics of the rectifying devices are the same. Therefore, even in a case in which rectifying devices are of the same type (high-speed diodes, for example), when the product names of the rectifying devices are different, the characteristics of the rectifying devices are different.

The detector 80 detects the identification information output by the identifier 70. Based on the identification information detected by the detector 80, the corrector 90 corrects the deviation between a high-frequency voltage and a target voltage caused by a leakage current of the rectifying device (hereinafter referred to as a deviation of high-frequency voltage or simply as a deviation). In the example of FIG. 2, the corrector 90 generates a correction voltage for canceling the deviation of high-frequency voltage, and adds the generated correction voltage to a control voltage. Details of the identifier 70 and the detector 80 will be described below.

(3) Wave Detector

Figure 3:
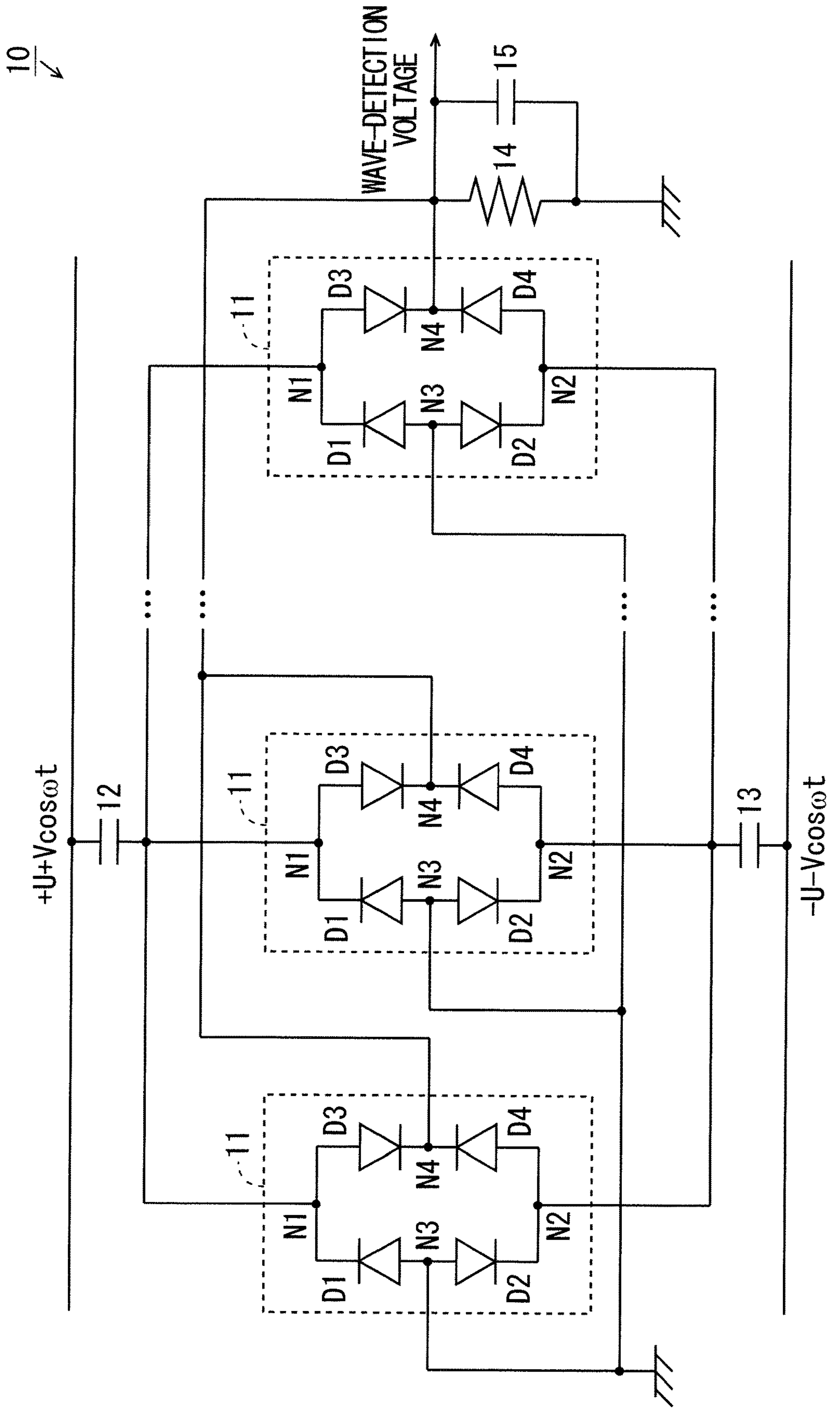
FIG. 3 is a diagram showing the configuration of a wave detector of FIG. 2.

The wave detector 10 is connected between the output terminals of the coil 60 and converts a high-frequency voltage output from the coil 60 into a wave-detection voltage. FIG. 3 is a diagram showing the configuration of the wave detector 10 of FIG. 2. As shown in FIG. 3, the wave detector 10 includes one or more rectifiers 11, wave-detection capacitors 12, 13, a detection resistor 14 and a smoothing capacitor 15.

The rectifier 11 includes four rectifying devices D1 to D4. The rectifying devices D1 to D4 are high-speed diodes or Schottky barrier diodes, for example. A cathode and an anode of the rectifying device D1 are connected to nodes N1, N3, respectively. A cathode and an anode of the rectifying device D2 are connected to a node N2 and the node N3, respectively. A cathode and an anode of the rectifying device D3 are connected to a nodes N4 and the node N1, respectively. A cathode and an anode of the rectifying device D4 are connected to the nodes N4, N2, respectively.

In a case in which being provided in the wave detector 10, a plurality of rectifiers 11 are connected in parallel. Specifically, nodes N1 of the plurality of rectifiers 11 are connected to one another, and nodes N2 of the plurality of rectifiers 11 are connected to one another. Further, nodes N3 of the plurality of rectifiers 11 are connected to one another, and nodes N4 of the plurality of rectifiers 11 are connected to one another. Nodes N3 of the plurality of rectifiers 11 are connected to a ground terminal.

The wave-detection capacitors 12, 13 are ceramic capacitors, for example. The wave-detection capacitor 12 is connected between the one output terminal of the coil 60 (FIG. 2) that outputs the voltage+U+Vcosωt and the node N1. The wave-detection capacitor 13 is connected between the other output terminal of the coil 60 that outputs the voltage−U−Vcosωt and the node N2. The detection resistor 14 and the smoothing capacitor 15 are connected in parallel to each other between the node N4 and the ground terminal.

With the above-mentioned configuration, a high-frequency voltage of the output terminal of the coil 60 is converted into a wave-detection current by the wave-detection capacitor 12 or the wave-detection capacitor 13, and is rectified by flowing through the plurality of rectifiers 11. The rectified current flows through the detection resistor 14 to be converted into a wave-detection voltage and is fed back to the voltage controller 20 of FIG. 2.

While the wave detector 10 includes the plurality of rectifiers 11 in the example of FIG. 3, the embodiment is not limited to this. The number of rectifiers 11 provided in the wave detector 10 may be one. Basically, in a case in which linearity of a leakage current in the rectifying devices D1 to D4 is good, one rectifier 11 is provided in the wave detector 10. A leakage current is a current flowing in a direction opposite to the rectifying direction in the rectifying devices D1 to D4.

A leakage current includes a DC component generated when a reverse voltage is applied, an AC component generated due to the junction capacitance between an anode and a cathode and a component generated due to a reverse recovery time. Good linearity means that the magnitude of a leakage current flowing through the rectifying devices D1 to D4 is substantially constant regardless of the magnitude of a wave-detection current flowing through the rectifying devices D1 to D4. Poor linearity means that, in a case in which the magnitude of a wave-detection current equal to or larger than a predetermined value flows through the rectifying devices D1 to D4, the magnitude of a leakage current flowing through the rectifying devices D1 to D4 rapidly increases.

Figure 4:
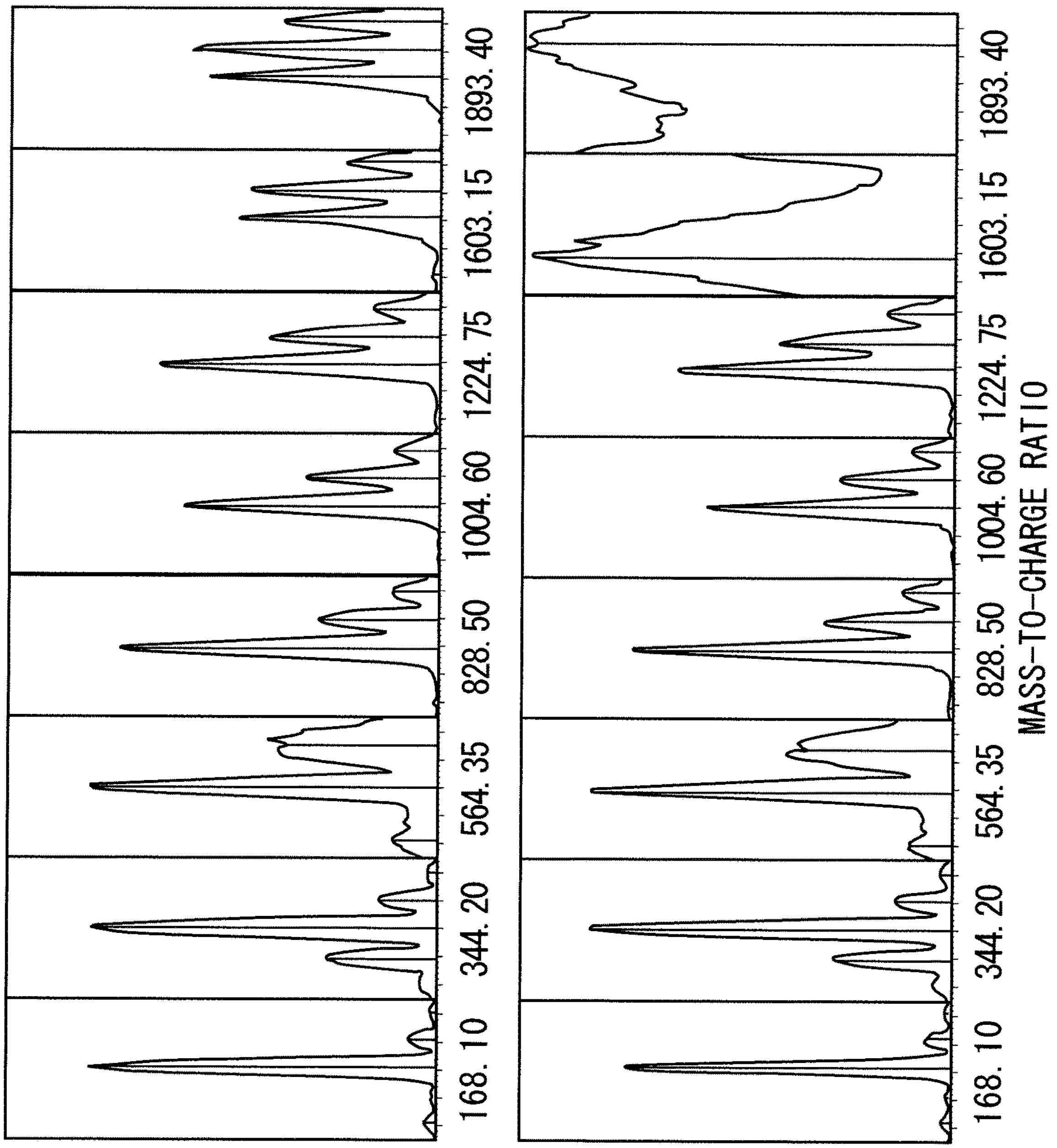
FIG. 4 is a diagram showing a mass spectrum that is obtained as a result of measurement with use of the wave detector including one rectifier.

FIG. 4 is a diagram showing a mass spectrum that is obtained as a result of measurement with use of the wave detector 10 including one rectifier 11. In FIG. 4, a plurality of peaks in the vicinity of specific mass-to-charge ratios are displayed in a magnified manner. The magnification ratios for the plurality of peaks are different from one another. The same also applies to FIGS. 6 to 9, described below.

The rectifier 11 of the wave detector 10 used for measurement of mass spectra in the upper part of FIG. 4 is constituted by the rectifying devices D1 to D4 having relatively good linearity of a leakage current. In this case, each peak is separated from other peaks without an increase in width of each peak as a whole. The rectifier 11 of the wave detector 10 used for measurement of mass spectra in the lower part of FIG. 4 is constituted by the rectifying devices D1 to D4 having relatively bad linearity of a leakage current. In this case, the width of a peak increases in a range in which the mass-to-charge ratio is large. Further, in a range in which the mass-to-charge ratio is large, each peak is not separated from the other peaks.

By an increase in number of parallel connections of the rectifier 11 in the wave detector 10, the linearity of a leakage current of the rectifying devices D1 to D4 is improved. Thus, also in a range in which the mass-to-charge ratio is relatively large, it is possible to correct a mass spectrum such that each peak is separated from the other peaks. On the other hand, the larger the number of parallel connections in the rectifier 11, the larger a deviation of high-frequency voltage. Even in this case, it is possible to cancel a deviation of high-frequency voltage by adding an appropriately defined correction voltage to a control voltage.

(4) Inventive Examples

In the following inventive examples 1 to 4, mass spectra were corrected with use of the rectifying devices D1 to D4 having different characteristics. Specifically, HSMS—281 manufactured by Broadcom, Inc. was used in the inventive example 1. In the inventive example 2, BAT81S manufactured by Vishay Intertechnology, Inc. was used. In the inventive example 3, RB706F—40 manufactured by ROHM Co., Ltd. was used. In the inventive example 4, BAV99 W manufactured by Nexperia B. V. was used.

Figure 5:
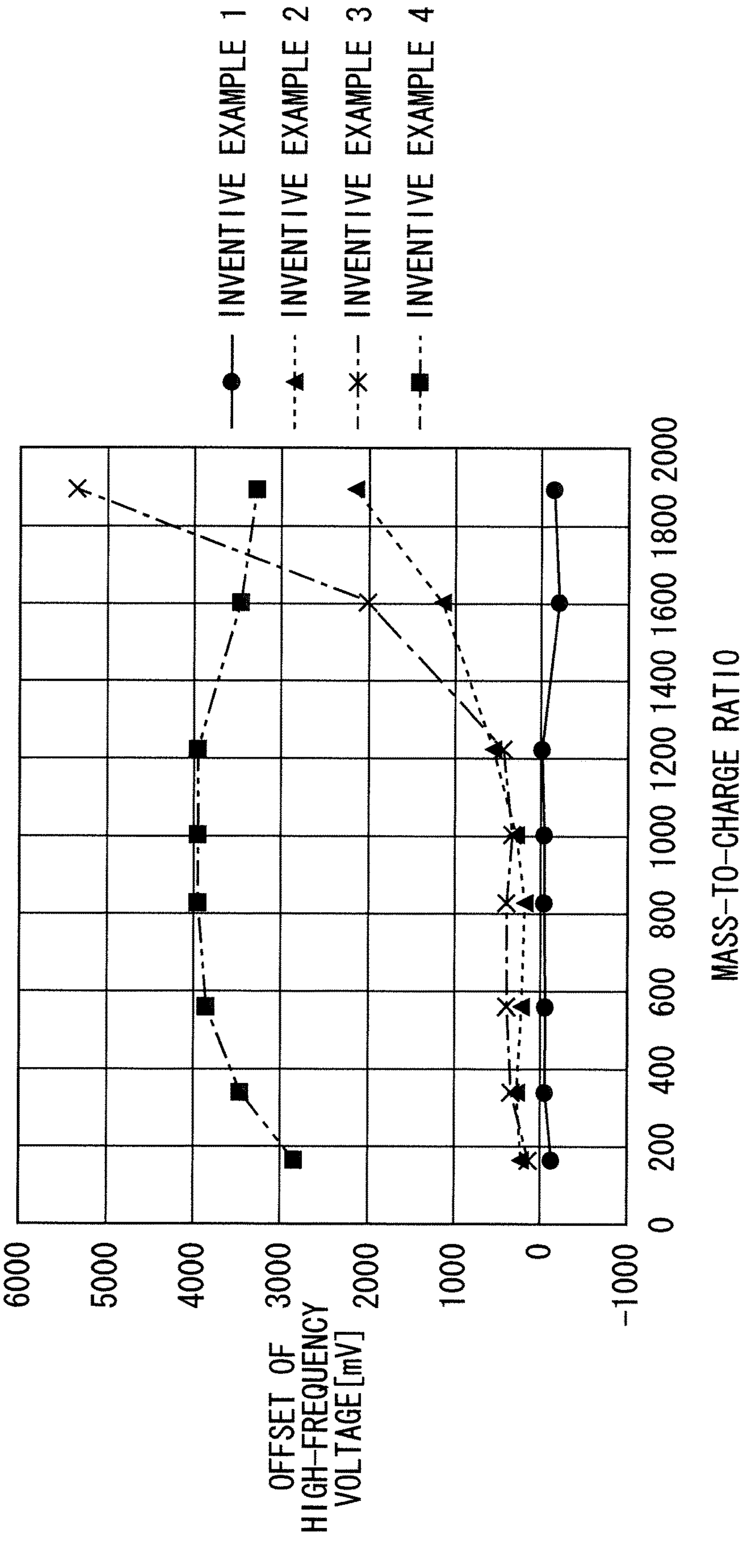
FIG. 5 is a diagram showing the characteristics of rectifying devices used in inventive examples.

FIG. 5 is a diagram showing the characteristics of the rectifying devices D1 to D4 used in the inventive examples 1 to 4. In FIG. 5, the abscissa indicates a mass-to-charge ratio, and the ordinate indicates a deviation of high-frequency voltage. As shown in FIG. 5, in the rectifying devices D1 to D4 of the inventive example 1, the deviation was a substantially constant value in the vicinity of 0 in the wide range of mass-to-charge ratio (0 to 2000). In the rectifying devices D1 to D4 of the inventive examples 2 and 3, the deviation was a relatively small constant value in the range of mass-to-charge ratio of 0 to 1200. However, the deviation increased in the range of mass-to-charge ratio of 1200 or higher. In the rectifying devices D1 to D4 of the inventive example 4, the deviation was large as a whole.

Figure 6:
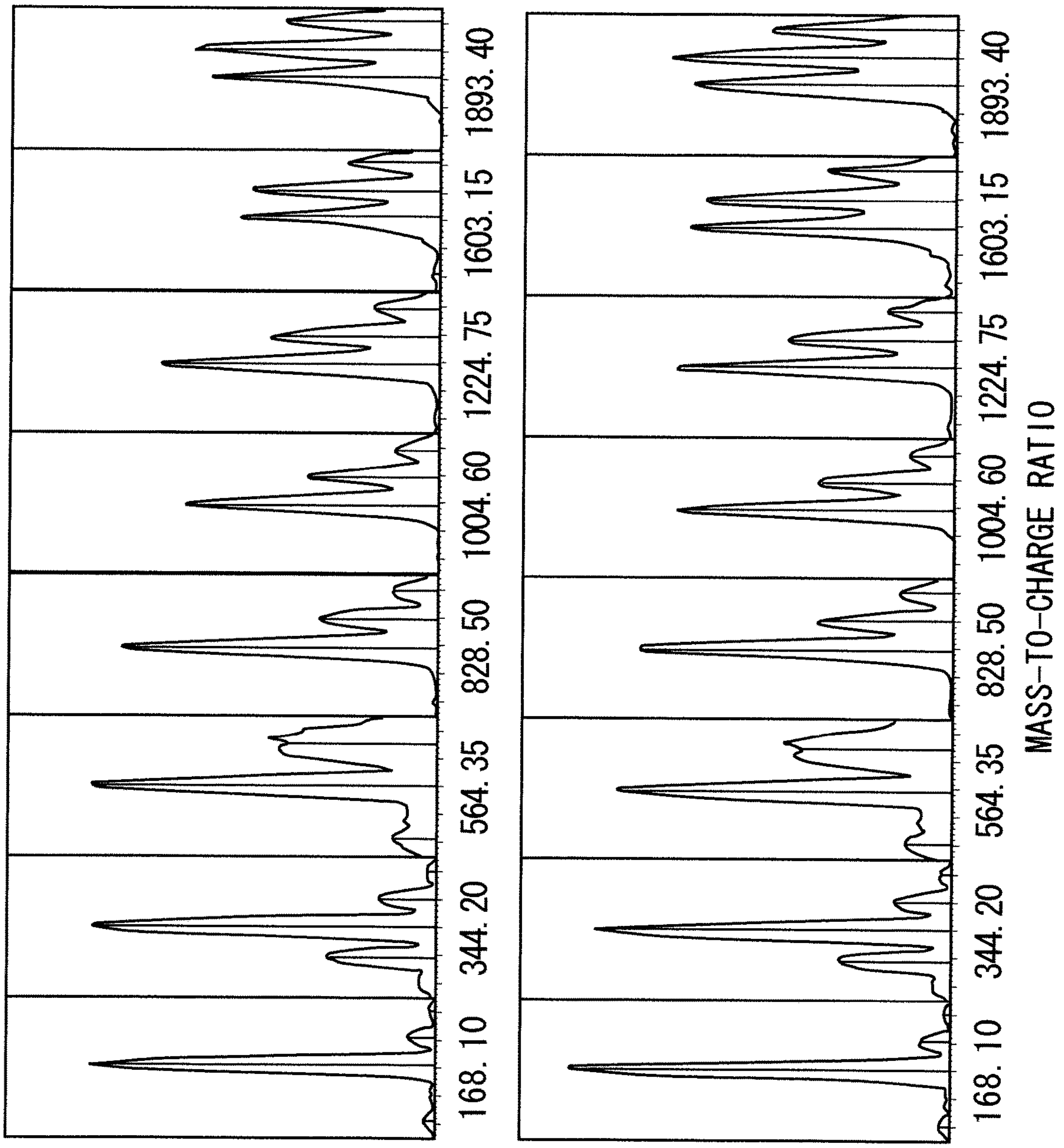
FIG. 6 is a diagram showing a mass spectrum in the inventive example 1.
Figure 7:
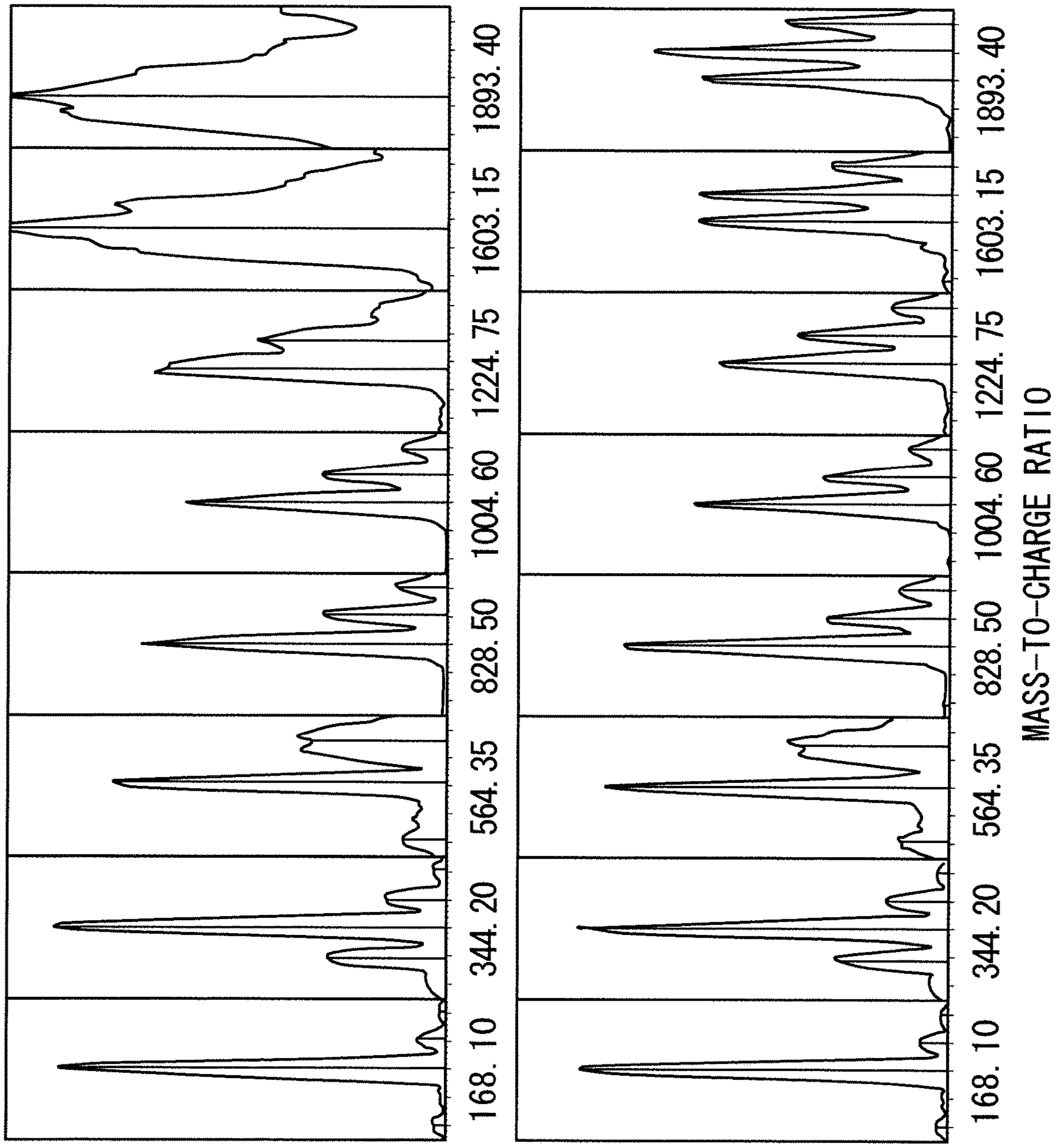
FIG. 7 is a diagram showing a mass spectrum in the inventive example 2.
Figure 8:
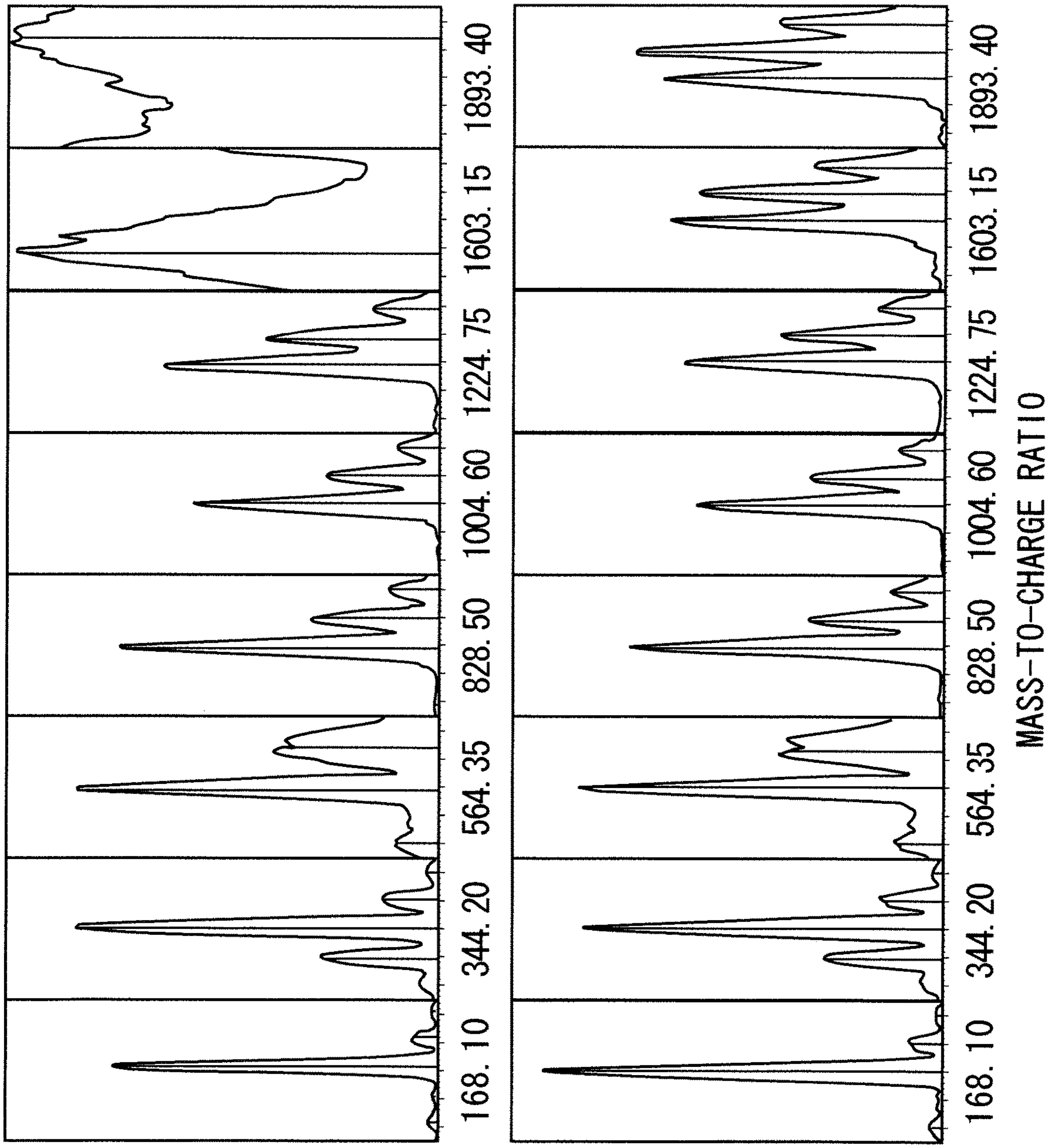
FIG. 8 is a diagram showing a mass spectrum in the inventive example 3.
Figure 9:
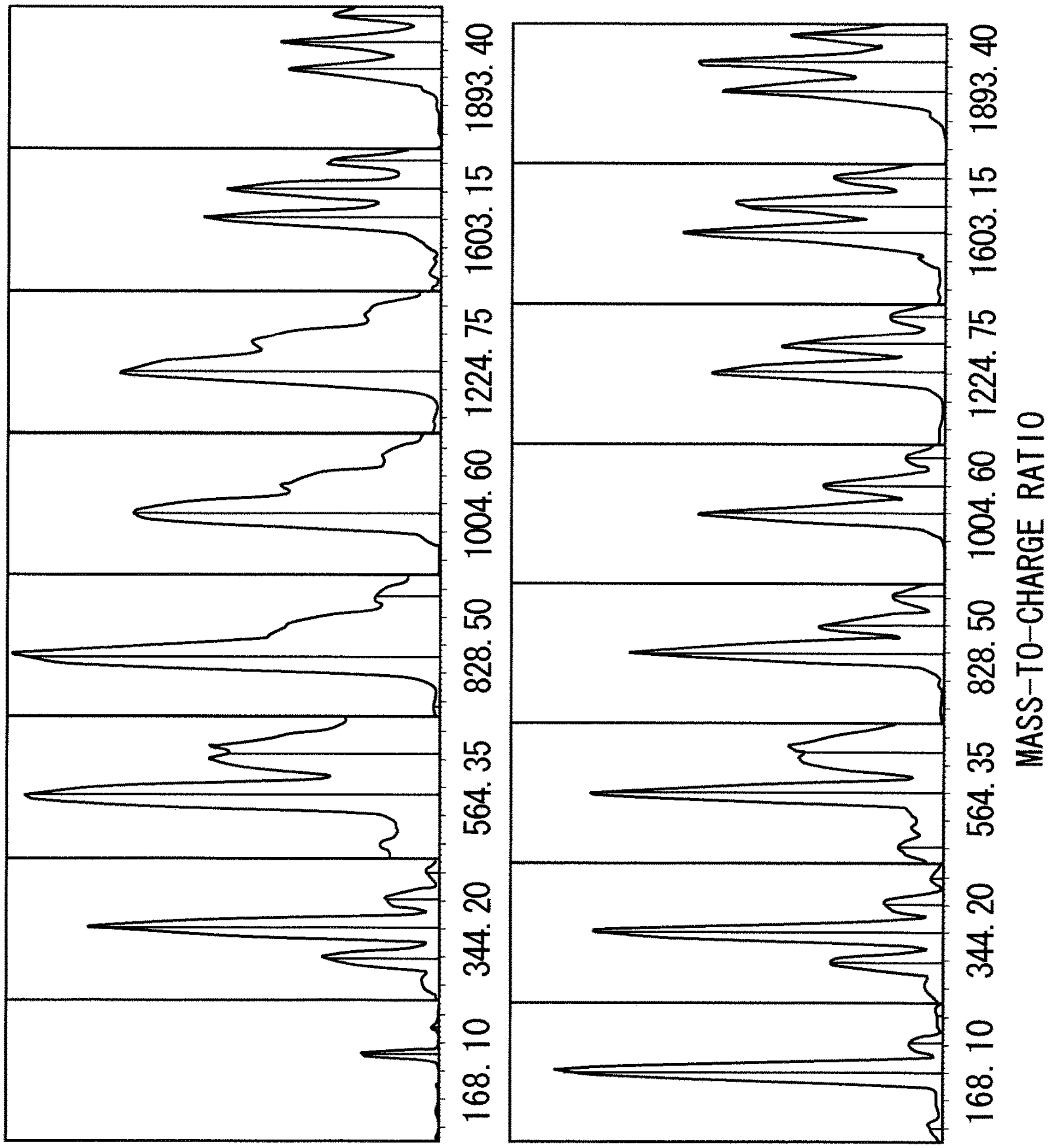
FIG. 9 is a diagram showing a mass spectrum in the inventive example 4.

FIG. 6 is a diagram showing a mass spectrum in the inventive example 1. FIG. 7 is a diagram showing a mass spectrum in the inventive example 2. FIG. 8 is a diagram showing a mass spectrum in the inventive example 3. FIG. 9 is a diagram showing a mass spectrum in the inventive example 4. In each of FIGS. 6 to 9, the mass spectrum before correction is shown in the upper part, and the mass spectrum after correction is shown in the lower part.

In the inventive example 1, as shown in the upper part of FIG. 6, even in a case in which a mass spectrum is not corrected, each peak is separated from the other peaks in regard to all of the mass-to-charge ratios. In this case, when correction is performed on software in order to make mass resolution be uniform, a good mass spectrum can be obtained as shown in the lower part of FIG. 6.

On the other hand, in the inventive examples 2 to 4, as shown in the upper parts of FIGS. 7 to 9, each peak is not separated from the other peaks in a predetermined range of mass-to-charge ratio. In this case, in order to separate each peak from the other peaks, the wave detector 10 including the plurality of rectifiers 11 connected in parallel is used for measurement of a mass spectrum. Further, an appropriate correction voltage is added to a control voltage as necessary. Thus, as shown in the lower parts of FIGS. 7 and 9, corrected good mass spectra are obtained.

The number of rectifiers 11 required for correcting a mass spectrum varies depending on the characteristics of the rectifying devices D1 to D4. Further, a correction voltage required for correcting a mass spectrum varies depending on the number of connections of the rectifiers 11 or the characteristics of the rectifying devices D1 to D4. Therefore, when the power supply device 100 of FIG. 2 is manufactured, the number, which is appropriately defined in accordance with the characteristics of the rectifying devices D1 to D4, of rectifying devices 11 are mounted on the wave-detection substrate 102. Further, a correction voltage appropriately defined in accordance with the number of connections of the rectifiers 11 or the characteristics of the rectifying devices D1 to D4 is set.

In this manner, the main substrate 101 is manufactured in association with the configuration of the rectifying devices D1 to D4 in the wave-detection substrate 102. However, in maintenance of the power supply device 100, the rectifying devices D1 to D4 may need to be replaced. In this case, when the rectifying devices D1 to D4 having characteristics different from those of the rectifying devices D1 to D4 before replacement are used as the rectifying devices D1 to D4 for replacement, the correspondence relationship between the wave-detection substrate 102 and the main substrate 101 fails. In order to prevent this, the identifier 70 and the detector 80 are mounted on the wave-detection substrate 102 and the main substrate 101, respectively. Details of the identifier 70 and the detector 80 will be described below.

(5) Identifier and Detector (a) First Example

Figure 10:
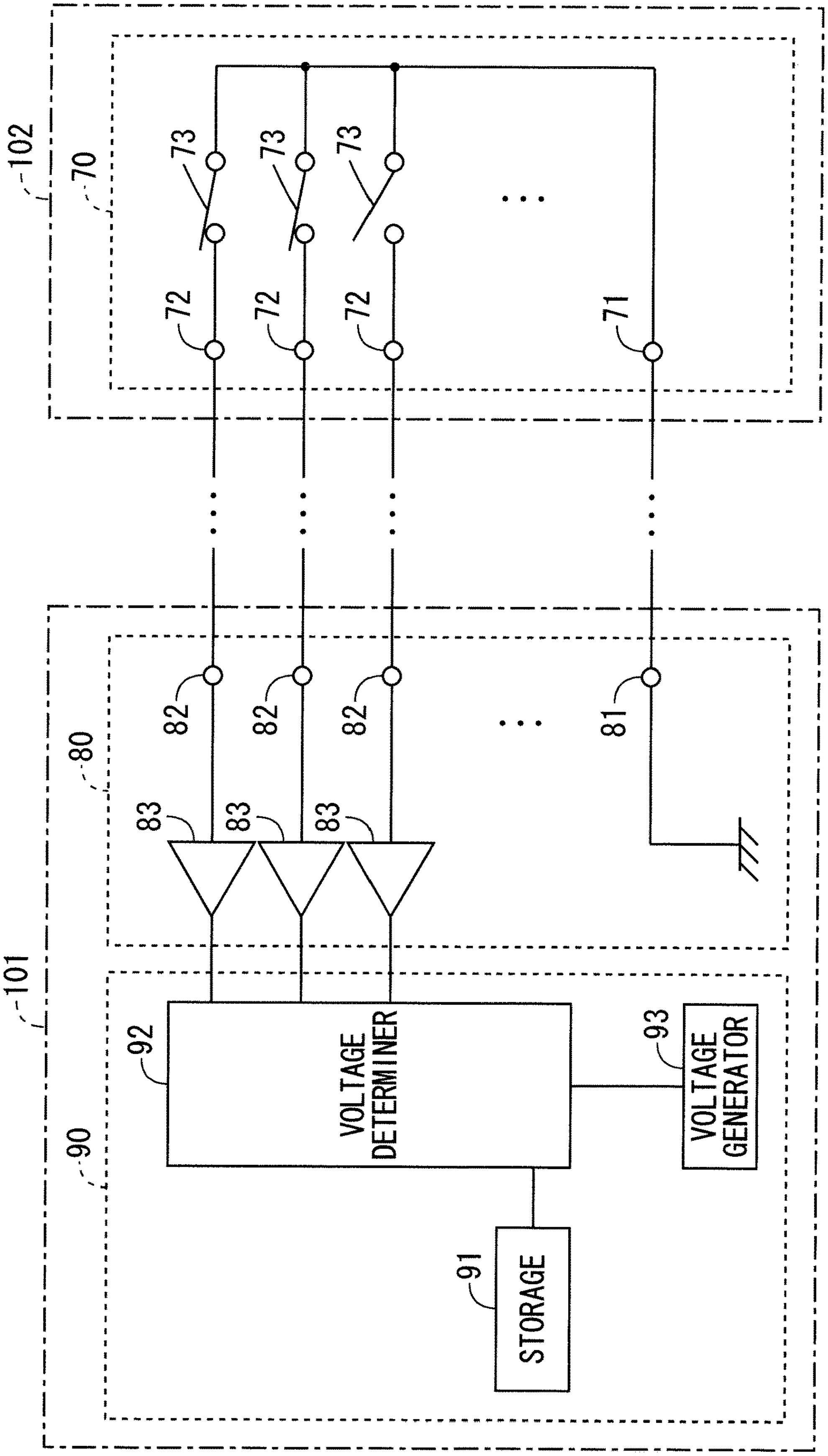
FIG. 10 is a diagram showing a first example of an identifier and a detector.

FIG. 10 is a diagram showing a first example of an identifier 70 and a detector 80. As shown in FIG. 10, the identifier 70 includes a ground terminal 71, one or more output terminals 72, and one or more switches 73. The ground terminal 71 is an example of a first terminal, and the output terminal 72 is an example of a second terminal. The one or more switches 73 correspond to the one or more output terminals 72, respectively. Each switch 73 is connected between the corresponding output terminal 72 and the ground terminal 71.

When the wave-detection substrate 102 is manufactured, the one or more switches 73 are opened or closed so as to correspond to the configuration of the rectifying devices D1 to D4 of the wave detector 10 mounted on the wave-detection substrate 102. In this case, any identification information can be easily output. The relationship between the configuration of the rectifying devices D1 to D4 and the open-close state of the one or more switches 73 is defined in advance.

For example, in a case in which two rectifiers 11 including the rectifying devices D1 to D4 to which a product name "X" is provided are connected in parallel, the configuration of the rectifying devices D1 to D4 and the open-close state of the one or more switches 73 may be associated with each other such that the first and second switches 73 are in a close state and the third switch 73 is in an open state. Further, in a case in which one rectifier 11 including the rectifying devices D1 to D4 to which a product name "Y" is provided is connected, the configuration of the rectifying devices D1 to D4 and the open-close state of the one or more switches 73 may be associated with each other such that the first switch 73 is in a close state and the second and third switches 73 are in an open state.

The detector 80 includes a ground terminal 81, one or more input terminals 82, and one or more operational amplifiers 83. The corrector 90 includes a storage 91, a voltage determiner 92 and a voltage generator 93. In the present example, a CPU is mounted on the main substrate 101. The voltage determiner 92 is a function implemented by the CPU. The voltage generator 93 includes a power supply that can generate a DC voltage in a predetermined range. The ground terminal 81 corresponds to the ground terminal 71 and is maintained at a ground potential. The one or more input terminals 82 correspond to the one or more output terminals 72, respectively. Further, the one or more operational amplifiers 83 are connected to the one or more input terminals 82, respectively.

The ground terminal 71 and the one or more output terminals 72 are connected to the ground terminal 81 and the one or more input terminals 82 by wiring, respectively. Thus, the ground terminal 71 is maintained at a ground potential. In a case in which being directly maintained at a ground potential, the ground terminal 71 does not need to be connected to the ground terminal 81. When the identifier 70 and the detector 80 are connected to each other, the state of the one or more switches 73 is detected as identification information by the one or more operational amplifiers 83.

FIG. 11 is a diagram showing one example of identification information. In the example of FIG. 11, the open state of each switch 73 is denoted by "0," and the close state is denoted by "1." The identification information is uniquely defined as any one of "0," "1," "2," "3," "4," . . . depending on the states of the plurality of switches 73.

For example, in a case in which the first and second switches 73 are in the close state, and the third switch 73 is in the open state, the identification information is "3." In a case in which the first switch 73 is in the close state, and the second and third switches 73 are in the open state, the identification information is "1."

The output identification information can be easily specified as a voltage by the one or more operational amplifiers 83. When the number of the output terminals 72 of the identifier 70 is n, the type of identification information is 2 n. Therefore, although the identifier 70 includes the plurality of output terminals 72 in the present example, the embodiment is not limited to this. In a case in which the type of identification information is 2, the identifier 70 includes the one output terminal 72.

A correction voltage suitable for correcting a deviation of high-frequency voltage is defined in accordance with the identification information. As such, in the storage 91, correspondence information representing the correspondence relationship between the identification information and the correction voltage for correcting a deviation of high-frequency voltage is stored in advance. FIG. 12 is a diagram showing one example of correspondence information. The correction voltage in FIG. 12 is specified by an experiment or the like with use of the various rectifying devices D1 to D4 when the power supply device 100 is manufactured.

The voltage determiner 92 acquires the identification information detected by the operational amplifier 83. Further, the voltage determiner 92 determines a correction voltage based on the acquired identification information and the correspondence information stored in the storage 91, and controls the voltage generator 93 such that the voltage generator 93 generates a determined correction voltage. In this case, it is possible to easily generate the correction voltage corresponding to the configuration of the rectifying devices D1 to D4. The voltage generator 93 adds the generated correction voltage to a control voltage. Thus, a deviation of high-frequency voltage caused by a leakage current of the rectifying devices D1 to D4 mounted on the wave-detection substrate 102 is corrected.

(b) Second Example

Figure 13:
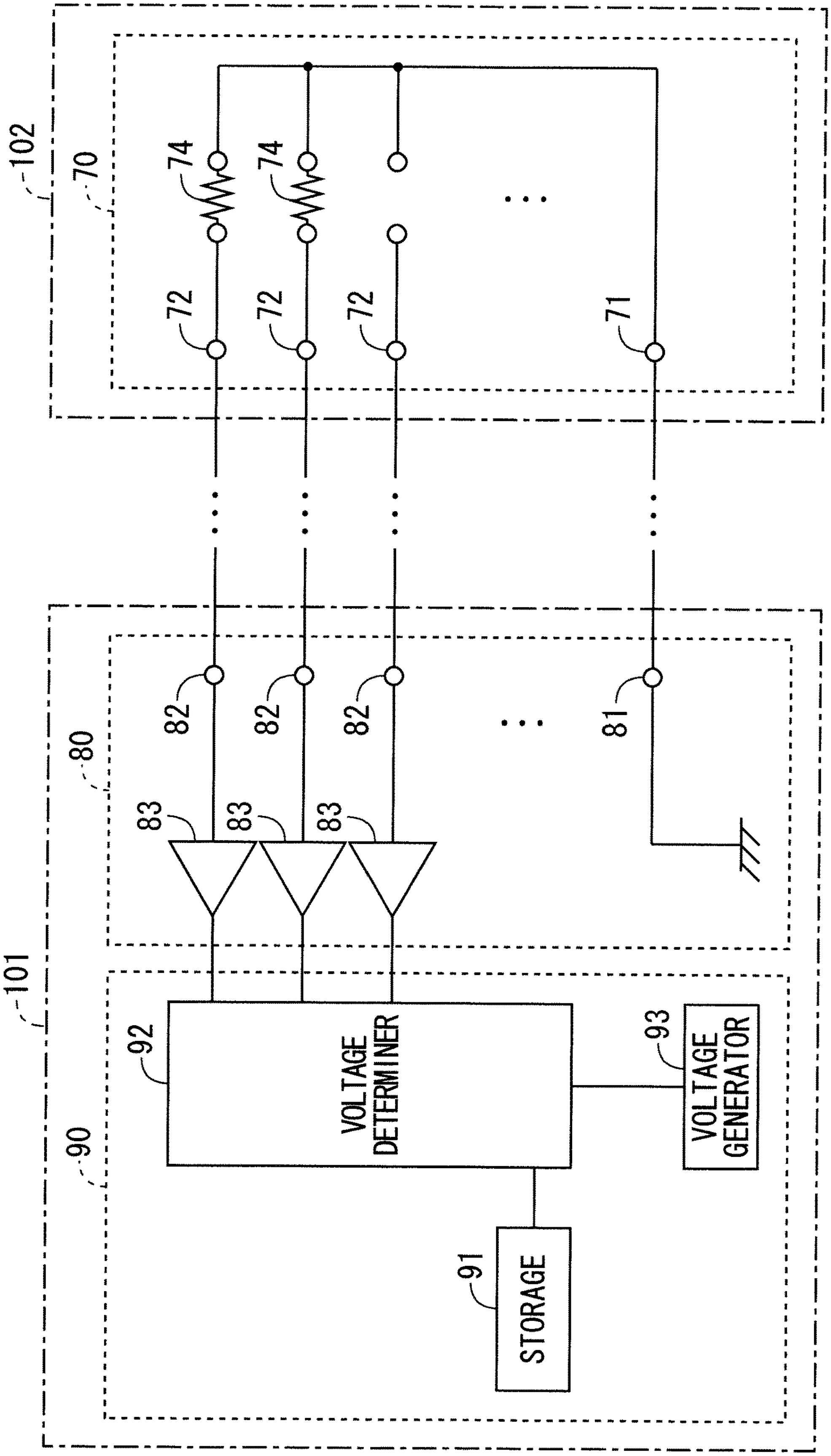
FIG. 13 is a diagram showing a second example of an identifier and a detector.

While the switch 73 is connected between the ground terminal 71 and each output terminal 72 in the first example of the identifier 70, the embodiment is not limited to this. FIG. 13 is a diagram showing a second example of an identifier 70 and a detector 80. As shown in FIG. 13, in the present example, an electrical resistor 74 having an extremely small resistance value is used instead of the switch 73. The electrical resistor 74 may be a jumper wire.

Specifically, the electrical resistor 74 is connected between the ground terminal 71 and the output terminal 72 to which the switch 73 to be in the close state is connected in the first example. On the other hand, the electrical resistor 74 is not connected between the ground terminal 71 and the output terminal 72 to which the switch 73 to be in the open state is connected in the first example. In this case, in the identification information of FIG. 11, the open state in which the electrical resistor 74 is not connected is denoted by "0," and the close state in which the electrical resistor 74 is connected is denoted by "1." Also with this configuration, identification information can be output from the identifier 70 to the detector 80 similarly to the first example of the identifier 70.

In this manner, in the first example or the second example of the identifier 70, identification information is defined in correspondence with the electrical connection state between the ground terminal 71 and the one or more output terminals 72. In this case, the identification information can be easily defined. In particular, in the first example, the identification information is defined in correspondence with the state of the switch 73. Therefore, it is possible to easily output any identification information by switching the state of the switch 73.

(c) Third Example

Figure 14:
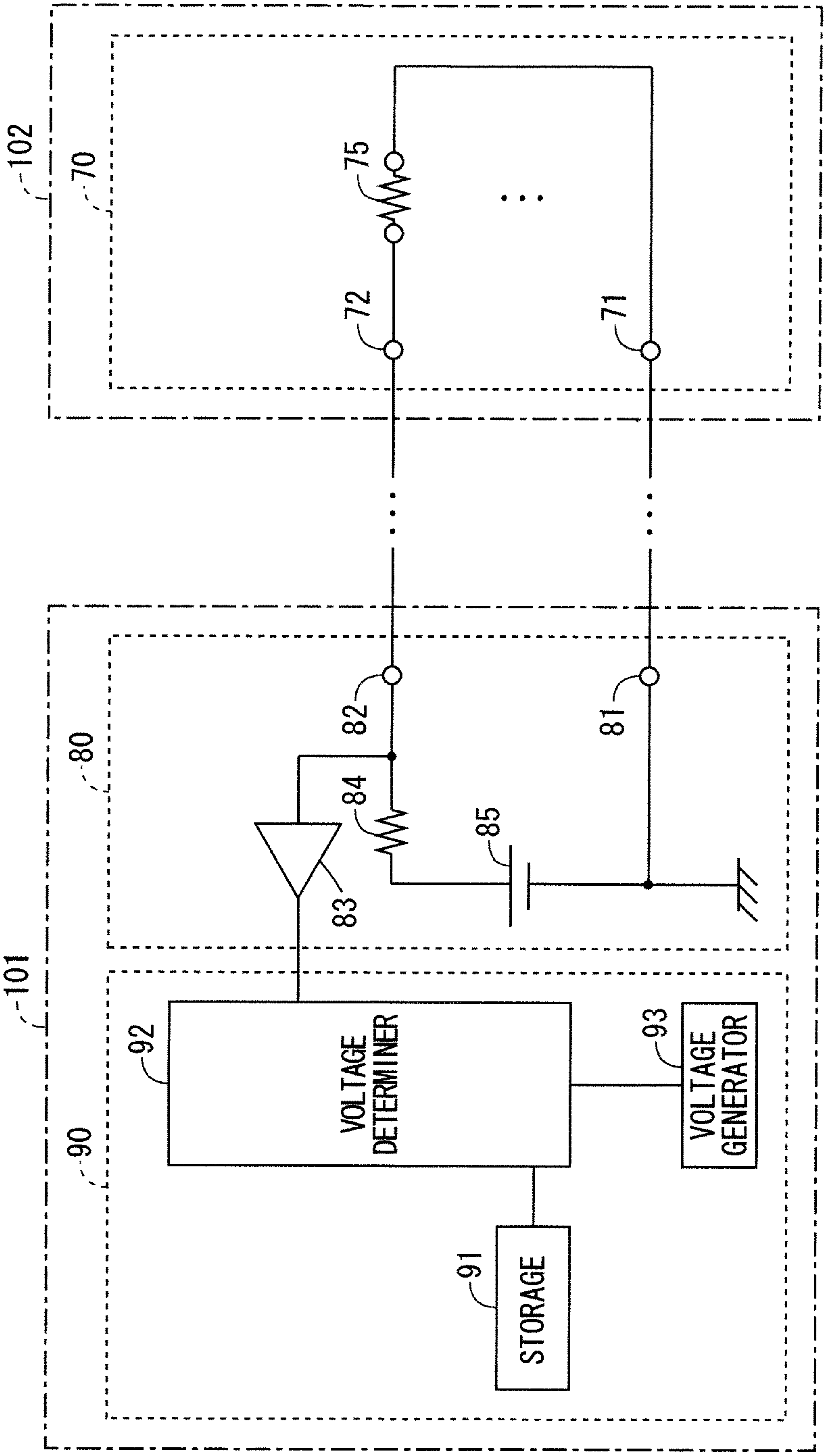
FIG. 14 is a diagram showing a third example of an identifier and a detector.

In regard to a third example of an identifier 70 and a detector 80, differences from the first example will be described. FIG. 14 is a diagram showing a third example of the identifier 70 and the detector 80. As shown in FIG. 14, the identifier 70 includes one output terminal 72 instead of a plurality of output terminals 72. Further, the identifier 70 includes an electrical resistor 75 instead of the switch 73. The electrical resistor 75 is connected between a ground terminal 71 and the output terminal 72.

The detector 80 includes one input terminal 82 instead of a plurality of input terminals, and an operational amplifier 83 instead of a plurality of operational amplifiers. The ground terminal 81 is an example of a third terminal, and the input terminal 82 is an example of a fourth terminal. Further, the detector 80 further includes an electrical resistor 84 and a power supply 85. The power supply 85 is a DC power supply, for example. The operational amplifier 83 is connected to the input terminal 82. The electrical resistor 84 is connected between the input terminal 82 and the positive electrode of the power supply 85. The negative electrode of the power supply 85 is connected to the ground terminal 81.

The ground terminal 71 and the output terminal 72 are connected to the ground terminal 81 and the input terminal 82 by wiring, respectively. The identifier 70 and the detector 80 are connected to each other, so that a voltage is applied by the power supply 85 to the electrical resistors 75, 84 connected in series. The potential between the electrical resistor 75 and the electrical resistor 84 is detected by the operational amplifier 83 as identification information. That is, the identification information is defined as a divided voltage of the electrical resistor 75.

In the present example, a voltage of the power supply 85 and a resistance value of the electrical resistor 84 are constant. For example, suppose that a voltage output by the power supply 85 is 5 V, and the resistance value of the electrical resistor 84 is 1 kΩ. On the other hand, as the electrical resistor 75, electrical resistors having different resistance values are used in accordance with the configuration of the rectifying devices D1 to D4. Therefore, the identification information is uniquely defined in correspondence with a resistance value of the electrical resistor 75.

When the wave-detection substrate 102 is manufactured, the electrical resistor 75 is connected between the ground terminal 71 and the output terminal 72 so as to correspond to the configuration of the rectifying devices D1 to D4 of the wave detector mounted on the wave-detection substrate 102. The relationship between the configuration of the rectifying devices D1 to D4 and a resistance value of the electrical resistor 75 is defined in advance.

For example, in a case in which two rectifiers 11 including the rectifying devices D1 to D4 to which the product name "X" is provided are connected in parallel, the configuration of the rectifying devices D1 to D4 and a resistance value of the electrical resistor 75 may be associated with each other such that the electrical resistor 75 having a resistance value 1 kΩ is connected. In this case, the identification information is 2.5 V. Further, in a case in which one rectifier 11 including the rectifying devices D1 to D4 to which the product name "Y" is provided are connected, the configuration of the rectifying devices D1 to D4 and the resistance value of the electrical resistor 75 may be associated with each other such that the electrical resistor 75 has a resistance value 100Ω. In this case, the identification information is about 0.5 V.

In the present example, desired identification information is selectable by the one electrical resistor 75. Therefore, it is not necessary to increase the mounting area of the wave-detection substrate 102. Thus, the power supply device 100 can be miniaturized. In the present example, the electrical resistor 75 may be a variable resistor the resistance value of which is adjustable. In this case, a resistance value of the electrical resistor 75 can be easily adjusted in accordance with the configuration of the rectifying devices D1 to D4.

The voltage determiner 92 acquires the identification information detected by the operational amplifier 83. Further, the voltage determiner 92 determines a correction voltage based on the acquired identification information and the correspondence information stored in the storage 91, and controls the voltage generator 93 such that the voltage generator 93 generates a determined correction voltage. The voltage generator 93 adds the generated correction voltage to a control voltage. Thus, a deviation of high-frequency voltage caused by a leakage current of the rectifying devices D1 to D4 mounted on the wave-detection substrate 102 is corrected.

(6) Modified Examples

Figure 15:
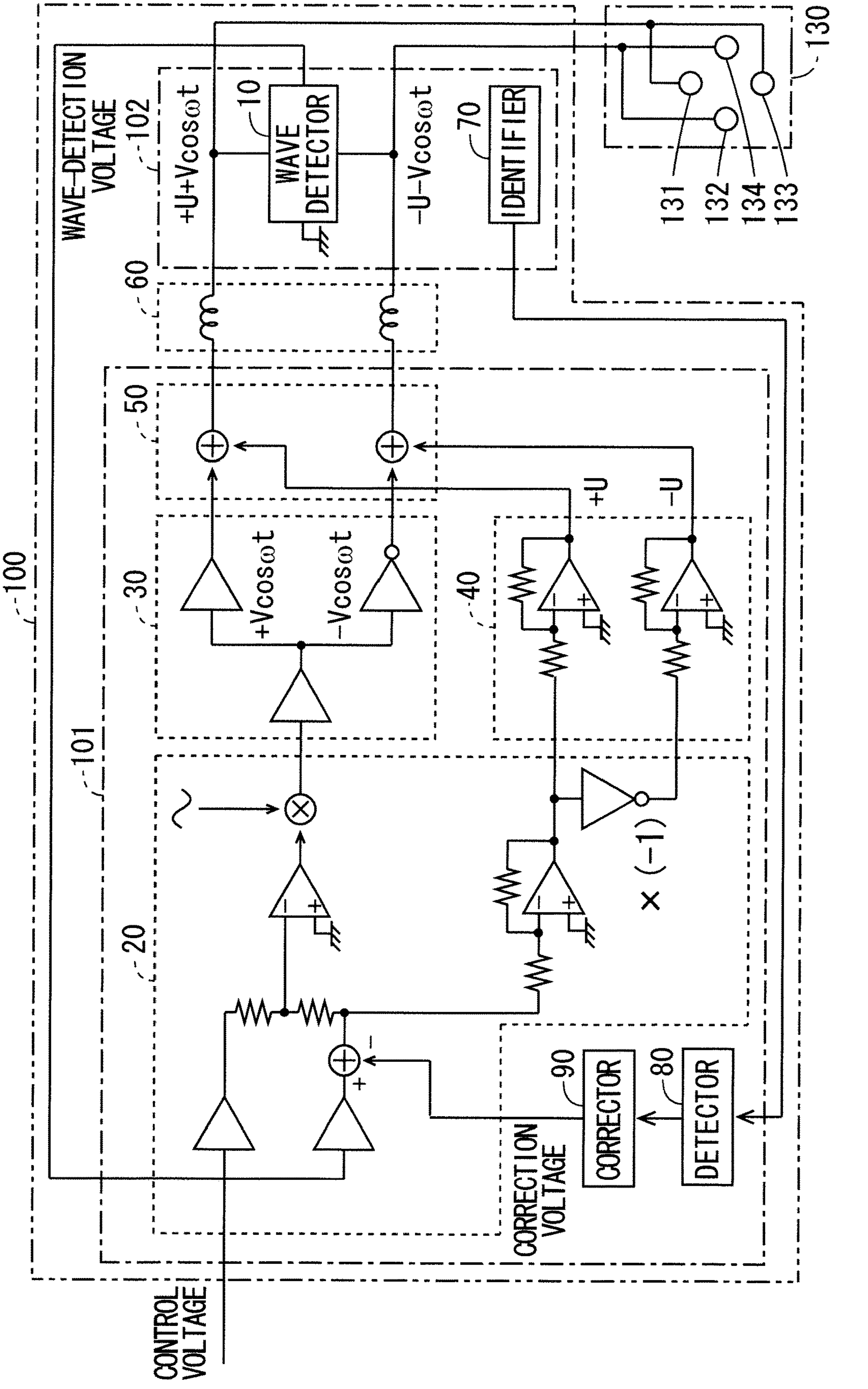
FIG. 15 is a diagram showing the configuration of a power supply device according to a first modified example.
Figure 16:
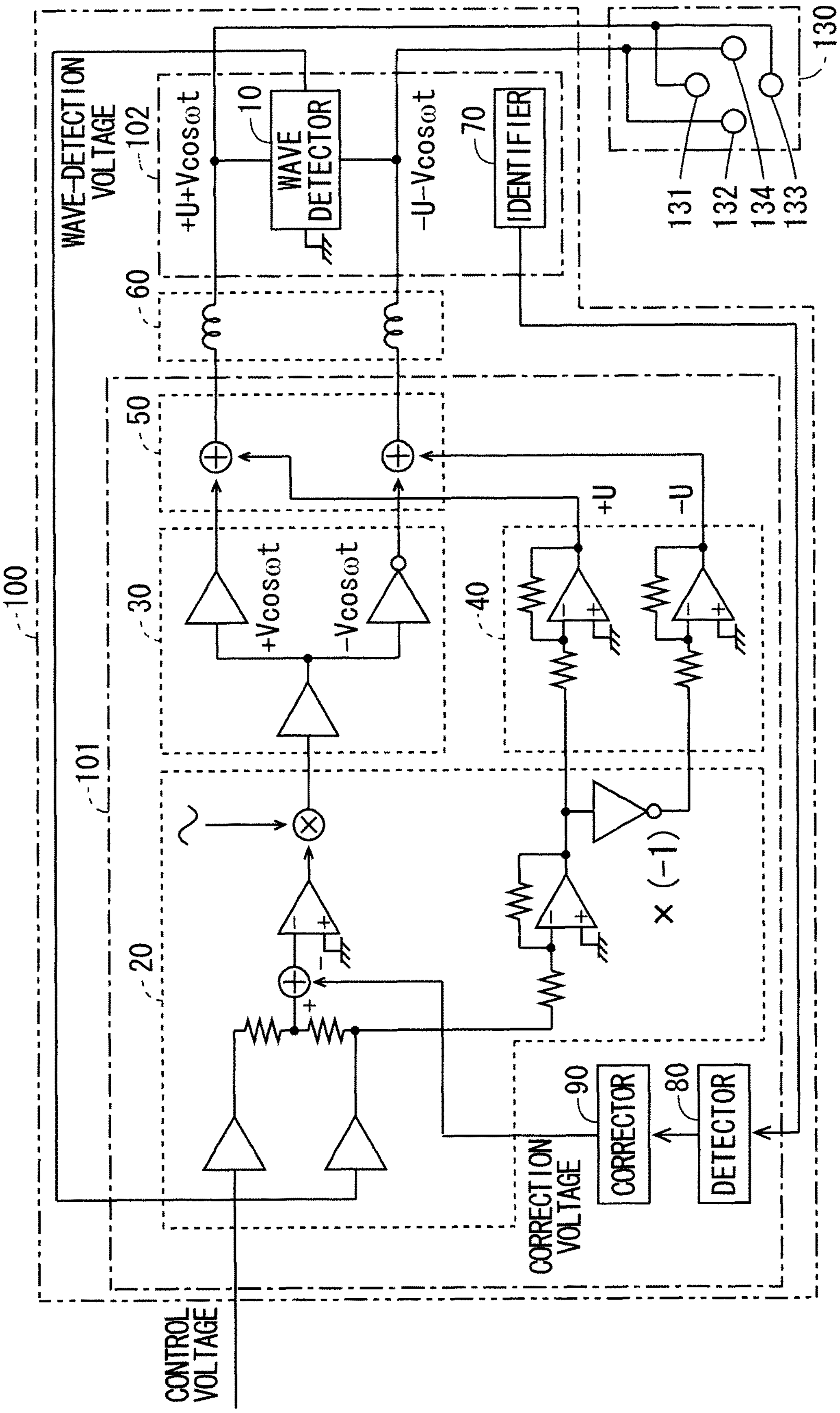
FIG. 16 is a diagram showing the configuration of a power supply device according to a second modified example.

While the corrector 90 adds a generated correction voltage to a control voltage in the present embodiment, the embodiment is not limited to this. FIG. 15 is a diagram showing the configuration of a power supply device 100 according to a first modified example. As shown in FIG. 15, a corrector 90 may add a generated correction voltage to a wave-detection voltage. FIG. 16 is a diagram showing the configuration of a power supply device 100 according to a second modified example. As shown in FIG. 16, a corrector 90 may add a generated correction voltage to a summed voltage of a control voltage and a wave-detection voltage. Even in these cases, similarly to the power supply device 100 of FIG. 2, a deviation of high-frequency voltage can be easily corrected.

(7) Effects

In the mass spectrometer 200 according to the present embodiment, the summed voltage of a DC voltage and a high-frequency voltage is applied to the quadrupole mass filter 130 by the power supply device 100. Ions having a mass-to-charge ratio corresponding to the applied voltage are selected by quadrupole mass filter 130. In the power supply device 100, a high-frequency voltage which is an AC component of a voltage applied to the quadrupole mass filter 130 is detected as a wave-detection voltage by the wave detector 10. Further, a deviation of high-frequency voltage caused by a leakage current of the rectifying devices D1 to D4 is corrected by the corrector 90.

In the power supply device 100, the wave detector 10 is mounted on the wave-detection substrate 102. The detector 80 that detects the identification information output by the wave detector 10 is mounted on the main substrate 101. Therefore, in maintenance of the power supply device 100, in a case in which the rectifying devices D1 to D4 of the wave detector 10 need to be replaced, only the wave-detection substrate 102 may be replaced. It is not necessary to replace the entire power supply device 100 including the wave-detection substrate 102 and the main substrate 101.

Further, in maintenance, in a case in which the rectifying devices D1 to D4 having characteristics equivalent to those of the rectifying devices D1 to D4 before replacement cannot be obtained, the rectifying devices D1 to D4 having characteristics different from those of the rectifying devices D1 to D4 before replacement are used. Even in this case, the rectifying elements D1 to D4 can be configured such that the linearity of a leakage current is improved in accordance with the characteristics of the rectifying devices D1 to D4 by a change in number of connections of the rectifier 11 or the like.

Here, when the configuration of the rectifying devices D1 to D4 is changed, a deviation of high-frequency voltage is changed. Even in this case, the identification information of the wave detector 10 defined in correspondence with the configuration of the rectifying devices D1 to D4 is output from the identifier 70 mounted on the wave-detection substrate 102. Therefore, in the main substrate 101, a deviation of high-frequency voltage is appropriately corrected by the corrector 90 based on the identification information corresponding to the configuration of the rectifying devices D1 to D4.

In this manner, with the above-mentioned configuration, it is not necessary to obtain the rectifying devices D1 to D4 having characteristics equivalent to those of the rectifying devices D1 to D4 before replacement during maintenance of the power supply device 100. Therefore, it is easy to select the rectifying devices D1 to D4 for replacement. Further, even in a case in which the configuration of the rectifying devices D1 to D4 in the wave-detection substrate 102 is changed, it is not necessary to replace the main substrate 101 in association with the configuration of the rectifying devices D1 to D4. As a result, the labor and cost for maintenance of the power supply device 100 can be reduced.

In the present embodiment, when the power supply device 100 is manufactured, the identification information corresponding to the configuration of the various available rectifying devices D1 to D4 is defined in advance. Therefore, in a case in which any rectifying devices D1 to D4 available at the time of manufacturing of the power supply device 100 are mounted on the wave-detection substrate 102, it is possible to correct a deviation of high-frequency voltage in correspondence with the configuration of the rectifying devices D1 to D4.

On the other hand, in maintenance of the power supply device 100, new rectifying devices D1 to D4 not associated with the identification information, such as the rectifying devices D1 to D4 that are sold after manufacture of the power supply device 100, may be used for replacement. In such a case, first, a correction voltage for correcting a deviation of high-frequency voltage suitable for the configuration of the rectifying devices D1 to D4 for replacement is specified by an experiment or the like. Then, the wave-detection substrate 102 on which the identifier 70 that outputs the identification information associated with a specified correction voltage is mounted is selected as a substrate for replacement. Thus, even in a case in which new rectifying devices D1 to D4 are used for replacement, it is possible to correct a deviation of high-frequency voltage in correspondence with the configuration of the rectifying devices D1 to D4.

(8) Other Embodiments (a) In the above-mentioned embodiment, the power supply device 100 includes the corrector 90, and the corrector 90 is mounted on the main substrate 101. In this case, the wiring for connecting the detector 80 and the corrector 90 to each other can be made compact. However, the embodiment is not limited to this. The corrector 90 may be provided in the processing device 150 of FIG. 1 or the like. In this case, the power supply device 100 does not include the corrector 90. Therefore, the corrector 90 does not have to be mounted on the main substrate 101.

Figure 17:
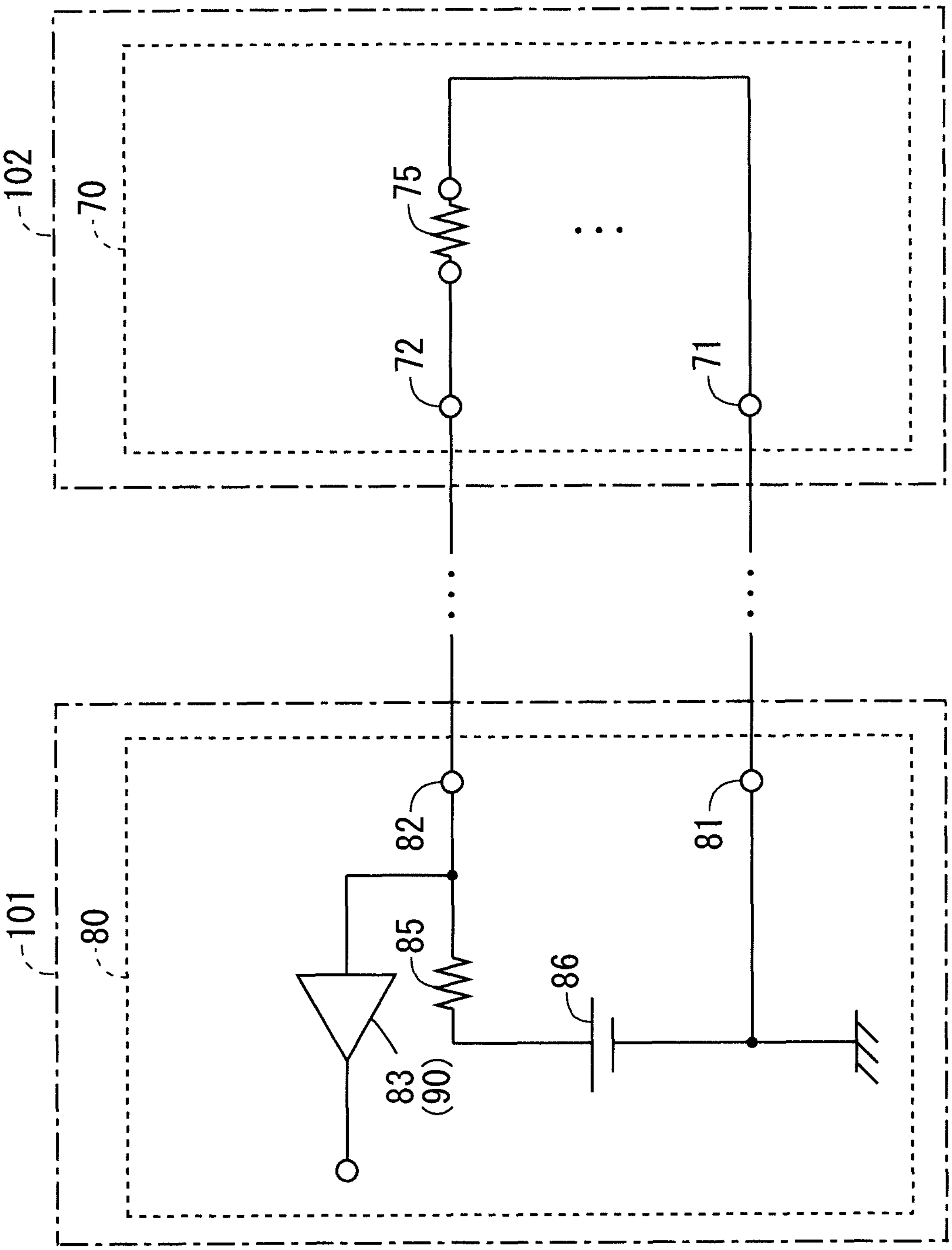
FIG. 17 is a diagram showing a corrector in another embodiment.

(b) While the corrector 90 includes the storage 91 and the voltage determiner 92 in the above-mentioned embodiment, the embodiment is not limited to this. FIG. 17 is a diagram showing a corrector 90 in another embodiment. In regard to the corrector 90 in the present embodiment, differences from the corrector 90 of FIG. 14 will be described.

As shown in FIG. 17, in the present embodiment, the corrector 90 does not include the storage 91, the voltage determiner 92 or the voltage generator 93, and a voltage output as identification information by the operational amplifier 83 is used as a correction voltage. Therefore, the operational amplifier 83 operates as the corrector 90.

In the present embodiment, it is possible to easily generate a correction voltage corresponding to the configuration of the rectifying devices D1 to D4. Thus, a deviation of high-frequency voltage corresponding to the configuration of the rectifying devices D1 to D4 is corrected. Further, in the present embodiment, because it is not necessary to use the storage 91, the voltage determiner 92 or the voltage generator 93, it is possible to realize the configuration for correcting a deviation of high-frequency voltage at relatively low cost.

In the present embodiment, the calculated value of a voltage output from the operational amplifier 83 as the identification information may be used as a correction voltage. For example, a voltage output from the operational amplifier 83 may be used as a correction voltage by being amplified or attenuated.

Further, also in the detector 80 of FIG. 10 or FIG. 14, identification information is detected as a predetermined voltage by the one or more operational amplifiers 83. Therefore, in a case in which a voltage corresponding to the identification information is suitable as a correction voltage corresponding to the identification information, the identification information output from the one or more operational amplifiers 83 or its calculated value may be used as a correction voltage.

(c) While the node N3 of each rectifier 11 is connected to the ground terminal and the node N4 of each rectifier 11 is connected to the detection resistor 14 and the smoothing capacitor 15 in the above-mentioned embodiment, the embodiment is not limited to this. The node N4 of each rectifier 11 may be connected to the ground terminal, and the node N3 of each rectifier 11 may be connected to the detection resistor 14 and the smoothing capacitor 15.

(d) While the rectifier 11 includes the four rectifying devices D1 to D4 constituting a full-wave rectifying circuit in the above-mentioned embodiment, the embodiment is not limited to this. The rectifier 11 may include one rectifying device constituting a half-wave rectifying circuit.

(e) While a deviation of high-frequency voltage (AC voltage) caused by a leakage current of the rectifying devices D1 to D4 is corrected by an AC voltage in the above-mentioned embodiment, the embodiment is not limited to this. A deviation of high-frequency voltage caused by a leakage current of the rectifying devices D1 to D4 may be corrected by a DC voltage.

With this configuration, the correspondence information representing the correspondence relationship between identification information and a correction voltage for correcting the above-mentioned deviation of high-frequency voltage may be stored in advance. Thus, the voltage determiner 92 can determine a correction voltage based on the acquired identification information and the correspondence information stored in the storage 91, and control the voltage generator 93 such that the voltage generator 93 generates a determined correction voltage.

(9) Aspects

It is understood by those skilled in the art that the plurality of above-mentioned illustrative embodiments are specific examples of the below-mentioned aspects.

(Item 1) A mass spectrometer according to one aspect may include a mass filter that selects ions having a mass-to-charge ratio corresponding to an applied voltage, a power supply device that has a first substrate and a second substrate and applies a voltage to the mass filter, and a corrector, wherein the first substrate may include a wave detector that detects an AC component of a voltage to be applied to the mass filter as a wave-detection voltage by using a rectifying device, and an identifier that outputs identification information of the wave detector defined in accordance with a configuration of the rectifying device of the wave detector, the second substrate may include a detector that detects the identification information output by the identifier, and the corrector may correct a deviation of voltage caused by a leakage current of the rectifying device based on the identification information detected by the detector.

In this mass spectrometer, a voltage is applied to the mass filter by a power supply device. Ions having a mass-to-charge ratio corresponding to an applied voltage are selected by the mass filter. In the power supply device, an AC component of a voltage applied to the mass filter is detected as a wave-detection voltage by the wave detector. Further, a deviation of a voltage caused by a leakage current of the rectifying device is corrected by the corrector.

In the power supply device, the wave detector is included in the first substrate. Further, the detector that detects the identification information output by the identifier is included in the second substrate. Therefore, in maintenance of the mass spectrometer, in a case in which the rectifying device of the wave detector needs to be replaced, only the first substrate needs to be replaced, and the entire power supply device including the first substrate and the second substrate does not need to be replaced.

Further, in maintenance, in a case in which a rectifying device having characteristics equivalent to that of the rectifying device before replacement cannot be obtained, a rectifying device having characteristics different from the rectifying device before replacement is used. Even in this case, the rectifying device can be configured such that the linearity of a leakage current is improved in accordance with the characteristics of the rectifying device by a change in number of connections of the rectifying device, etc.

Here, when the configuration of the rectifying device is changed, a deviation of voltage is changed. Even in this case, the identification information of the wave detector defined in correspondence with the configuration of the rectifying device is output from the identifier included in the first substrate. Therefore, in the second substrate, a deviation of voltage is appropriately corrected by the corrector based on the identification information corresponding to the configuration of the rectifying device.

In this manner, with the above-mentioned configuration, when the mass spectrometer is maintained, because it is not necessary to obtain a rectifying device having characteristics equivalent to those of the rectifying device before replacement, a rectifying device for replacement is easily selected. Further, in a case in which the configuration of the rectifying device in the first substrate is changed, it is not necessary to replace the second substrate in association with the configuration of the rectifying device. As a result, the labor and cost for maintenance of the mass spectrometer can be reduced.

(Item 2) The mass spectrometer according to item 1, wherein the identifier may include a first terminal, and one or more second terminals, and the identification information may be defined in correspondence with an electrical connection state between the first terminal and the one or more second terminals.

In this case, the identification information can be easily defined.

(Item 3) The mass spectrometer according to item 2, wherein the identifier may further include a switch connected between the first terminal and the one or more second terminals, and the identification information may be defined in accordance with an open-close state of the switch.

In this case, any identification information can be easily output. Further, the output identification information can be easily specified.

(Item 4) The mass spectrometer according to item 1, wherein the identifier may include a first terminal, a second terminal, and a first electrical resistor connected between the first terminal and the second terminal, and the identification information may be defined in correspondence with a resistance value of the first electrical resistor.

In this case, the identification information can be easily defined. Further, even in a case in which there are many types of identification information, it is not necessary to provide a large number of devices in the first substrate, so that an increase in size of the first substrate is prevented. Thus, the power supply device can be miniaturized.

(Item 5) The mass spectrometer according to item 4, wherein the detector may include a third terminal corresponding to the first terminal, a fourth terminal corresponding to the second terminal, and a power supply and a second electrical resistor connected between the third terminal and the fourth terminal, and the identification information may be defined in correspondence with a divided voltage of the first electrical resistor.

In this case, the output identification information can be easily specified.

(Item 6) The mass spectrometer according to any one of items 1 to 5, wherein the corrector may include a storage that, in advance, stores correspondence information representing a correspondence relationship between the identification information and a correction voltage for correcting a deviation of voltage, a voltage determiner that determines a correction voltage based on the correspondence information stored in the storage, and a voltage generator that generates a correction voltage determined by the voltage determiner.

In this case, it is possible to easily generate a correction voltage corresponding to the configuration of the rectifying device. Thus, a deviation of a voltage corresponding to the configuration of the rectifying device is corrected.

(Item 7) The mass spectrometer according to item 6, wherein the corrector may be provided in the second substrate.

In this case, the wiring for connecting the detector and the corrector to each other can be made compact.

(Item 8) The mass spectrometer according to item 6, wherein a control voltage for controlling a voltage to be applied to the mass filter may be input to the second substrate, and the voltage generator may add a generated correction voltage to the control voltage.

In this case, a deviation of voltage can be easily corrected.

(Item 9) The mass spectrometer according to item 6, wherein the voltage generator may add a generated correction voltage to the wave-detection voltage.

In this case, a deviation of voltage can be easily corrected.

(Item 10) The mass spectrometer according to item 6, wherein a control voltage for controlling a voltage to be applied to the mass filter may be input to the second substrate, and the voltage generator may add a generated correction voltage to a summed voltage of the control voltage and the wave-detection voltage.

In this case, a deviation of voltage can be easily corrected.

(Item 11) The mass spectrometer according to any one of items 1 to 5, wherein the corrector may generate the identification information or a calculated value of the identification information as a correction voltage.

In this case, it is possible to easily generate a correction voltage corresponding to the configuration of the rectifying device. Thus, a deviation of a voltage corresponding to the configuration of the rectifying device is corrected. Further, the configuration for correcting a deviation of voltage can be realized at relatively low cost.

(Item 12) The mass spectrometer according to item 11, wherein a control voltage for controlling a voltage to be applied to the mass filter may be input to the second substrate, and the corrector may add a generated correction voltage to the control voltage.

In this case, a deviation of voltage can be easily corrected.

(Item 13) The mass spectrometer according to item 11, wherein the corrector may add a generated correction voltage to the wave-detection voltage.

In this case, a deviation of voltage can be easily corrected.

(Item 14) The mass spectrometer according to item 11, wherein a control voltage for controlling a voltage to be applied to the mass filter may be input to the second substrate, and the corrector may add a generated correction voltage to a summed voltage of the control voltage and the wave-detection voltage.

In this case, a deviation of voltage can be easily corrected.

(Item 15) A power supply device may apply a voltage to a mass filter that selects ions having a mass-to-charge ratio corresponding to an applied voltage, and include a first substrate, and a second substrate, wherein the first substrate may include a wave detector that detects an AC component of a voltage to be applied to the mass filter as a wave-detection voltage by using a rectifying device, and an identifier that outputs identification information of the wave detector defined in accordance with a configuration of the rectifying device of the wave detector, and the second substrate may include a detector that detects the identification information output by the identifier and supplies the detected identification information to a corrector for correcting a deviation of voltage caused by a leakage current of the rectifying device based on the identification information.

With this power supply device, because it is not necessary to obtain a rectifying device having characteristics equivalent to those of the rectifying device before replacement during maintenance, a rectifying device for replacement can be easily selected. Further, even in a case in which the configuration of the rectifying device in the first substrate is changed, it is not necessary to replace the second substrate in association with the configuration of the rectifying device. As a result, the labor and cost for maintenance of the power supply device can be reduced.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A mass spectrometer comprising:

a mass filter that selects ions having a mass-to-charge ratio corresponding to an applied voltage;

a power supply device that has a first substrate and a second substrate and applies a voltage to the mass filter; and a corrector, wherein the first substrate includes a wave detector that detects an AC component of a voltage to be applied to the mass filter as a wave-detection voltage by using a rectifying device, and an identifier that outputs identification information of the wave detector defined in accordance with a configuration of the rectifying device of the wave detector, the second substrate includes a detector that detects the identification information output by the identifier, and the corrector corrects a deviation of voltage caused by a leakage current of the rectifying device based on the identification information detected by the detector.

2. The mass spectrometer according to claim 1, wherein the identifier includes a first terminal, and one or more second terminals, and the identification information is defined in correspondence with an electrical connection state between the first terminal and the one or more second terminals.

3. The mass spectrometer according to claim 2, wherein the identifier further includes a switch connected between the first terminal and the one or more second terminals, and the identification information is defined in accordance with an open-close state of the switch.

4. The mass spectrometer according to claim 1, wherein the identifier includes a first terminal, a second terminal, and a first electrical resistor connected between the first terminal and the second terminal, and the identification information is defined in correspondence with a resistance value of the first electrical resistor.

5. The mass spectrometer according to claim 4, wherein the detector includes a third terminal corresponding to the first terminal, a fourth terminal corresponding to the second terminal, and a power supply and a second electrical resistor connected between the third terminal and the fourth terminal, and the identification information is defined in correspondence with a divided voltage of the first electrical resistor.

6. The mass spectrometer according to claim 1, wherein the corrector includes a storage that, in advance, stores correspondence information representing a correspondence relationship between the identification information and a correction voltage for correcting a deviation of voltage, a voltage determiner that determines a correction voltage based on the correspondence information stored in the storage, and a voltage generator that generates a correction voltage determined by the voltage determiner.

7. The mass spectrometer according to claim 6, wherein the corrector is provided in the second substrate.

8. The mass spectrometer according to claim 6, wherein a control voltage for controlling a voltage to be applied to the mass filter is input to the second substrate, and the voltage generator adds a generated correction voltage to the control voltage.

9. The mass spectrometer according to claim 6, wherein the voltage generator adds a generated correction voltage to the wave-detection voltage.

10. The mass spectrometer according to claim 6, wherein a control voltage for controlling a voltage to be applied to the mass filter is input to the second substrate, and the voltage generator adds a generated correction voltage to a summed voltage of the control voltage and the wave-detection voltage.

11. The mass spectrometer according to claim 1, wherein the corrector generates the identification information or a calculated value of the identification information as a correction voltage.

12. The mass spectrometer according to claim 11, wherein a control voltage for controlling a voltage to be applied to the mass filter is input to the second substrate, and the corrector adds a generated correction voltage to the control voltage.

13. The mass spectrometer according to claim 11, wherein the corrector adds a generated correction voltage to the wave-detection voltage.

14. The mass spectrometer according to claim 11, wherein a control voltage for controlling a voltage to be applied to the mass filter is input to the second substrate, and the corrector adds a generated correction voltage to a summed voltage of the control voltage and the wave-detection voltage.

15. A power supply device that applies a voltage to a mass filter that selects ions having a mass-to-charge ratio corresponding to an applied voltage, comprising:

a first substrate; and a second substrate, wherein the first substrate includes a wave detector that detects an AC component of a voltage to be applied to the mass filter as a wave-detection voltage by using a rectifying device, and an identifier that outputs identification information of the wave detector defined in accordance with a configuration of the rectifying device of the wave detector, and the second substrate includes a detector that detects the identification information output by the identifier and supplies the detected identification information to a corrector for correcting a deviation of voltage caused by a leakage current of the rectifying device based on the identification information.

* * * * *